United States Patent
Tischer et al.

(10) Patent No.: US 8,380,879 B2
(45) Date of Patent: Feb. 19, 2013

(54) INTERFACE DEVICES FOR FACILITATING COMMUNICATIONS BETWEEN DEVICES AND COMMUNICATIONS NETWORKS

(75) Inventors: Steven Tischer, Atlanta, GA (US); Samuel N. Zellner, Dunwoody, GA (US); Robert J. Starr, Decatur, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 13/089,577

(22) Filed: Apr. 19, 2011
(Under 37 CFR 1.47)

(65) Prior Publication Data
US 2011/0255686 A1    Oct. 20, 2011

Related U.S. Application Data

(63) Continuation of application No. 11/324,034, filed on Dec. 30, 2005, now abandoned, which is a continuation-in-part of application No. 10/195,197, filed on Jul. 15, 2002, now Pat. No. 7,194,083.

(51) Int. Cl.
*G06F 15/16* (2006.01)
(52) U.S. Cl. .................. 709/246; 455/426.1; 455/426.2; 455/552.1; 455/553.1; 455/554.1; 455/554.2; 455/555; 455/557; 370/465; 370/466; 370/467; 370/401; 709/230; 709/231; 709/238; 709/242; 709/250
(58) Field of Classification Search ............... 455/414.1, 455/414.4, 426.1, 426.2, 466.7, 11.1, 74.1, 455/554.1, 554.2, 557, 552.1, 553.1; 370/465, 370/466, 467, 401; 709/230, 231, 238, 242, 709/246, 250
See application file for complete search history.

(56) References Cited

U.S. PATENT DOCUMENTS

| | | | |
|---|---|---|---|
| 4,218,590 A | 8/1980 | Rasmussen et al. |
| 4,691,338 A | 9/1987 | Makino |
| 5,222,123 A | 6/1993 | Brown et al. |
| 5,257,406 A | 10/1993 | Ito et al. |
| 5,475,734 A | 12/1995 | McDonald et al. |
| 5,479,480 A | 12/1995 | Scott |
| 5,497,412 A | 3/1996 | Lannen et al. |
| 5,564,072 A | 10/1996 | Garcia Aguilera et al. |
| 5,675,629 A | 10/1997 | Raffel et al. |
| 5,757,902 A | 5/1998 | Mitsuo |
| 5,758,281 A | 5/1998 | Emery et al. |
| 5,826,193 A | 10/1998 | Ghisler et al. |
| 5,901,359 A | 5/1999 | Malmstrom |
| 5,911,120 A | 6/1999 | Jarett et al. |

(Continued)

OTHER PUBLICATIONS

U.S. Offical Action dated Sep. 14, 2011 in U.S. Appl. No. 11/952,510.

(Continued)

*Primary Examiner* — Olumide T Ajibade Akonai
(74) *Attorney, Agent, or Firm* — Hope Baldauff Hartman, LLC

(57) ABSTRACT

Interface devices for facilitating communications between devices and communications networks are provided. According to one aspect, a destination interface device for providing communications between a first device and a second device comprises one or more inputs, one or more outputs, and logic. The one or more inputs of the destination interface device receive data in a first format from a source interface device. The logic translates the data to a second format compatible with the second device. The translated data is then transmitted to the second device via the one or more outputs. The destination interface device may subscribe to the source interface device for access to enhanced features as well as for access to data associated with communications networks and devices.

8 Claims, 21 Drawing Sheets

U.S. PATENT DOCUMENTS

| | | | |
|---|---|---|---|
| 5,926,760 | A | 7/1999 | Khan et al. |
| 5,970,388 | A | 10/1999 | Will |
| 5,982,854 | A | 11/1999 | Ehreth |
| 5,987,678 | A | 11/1999 | Ayers |
| 6,138,026 | A | 10/2000 | Irvin |
| 6,167,278 | A | 12/2000 | Nilssen |
| 6,208,627 | B1 | 3/2001 | Menon et al. |
| 6,222,919 | B1 | 4/2001 | Hollatz et al. |
| 6,259,925 | B1 | 7/2001 | Josse |
| 6,297,646 | B1 | 10/2001 | Lang et al. |
| 6,301,474 | B1 | 10/2001 | Hartmaier et al. |
| 6,643,709 | B1 * | 11/2003 | Kwon ............ 709/246 |
| 6,792,095 | B1 | 9/2004 | Frank |
| 6,978,141 | B2 | 12/2005 | Smith et al. |
| 7,003,287 | B2 | 2/2006 | Roeder |
| 7,035,633 | B2 | 4/2006 | Kirkpatrick |
| 7,136,358 | B2 * | 11/2006 | Kunito et al. ............ 370/238 |
| 7,203,199 | B1 * | 4/2007 | Duree et al. ............ 370/395.6 |
| 7,315,553 | B2 * | 1/2008 | Keller-Tuberg et al. ...... 370/463 |
| 7,418,492 | B1 | 8/2008 | Cohen et al. |
| 7,437,330 | B1 | 10/2008 | Robinson et al. |
| 2002/0021669 | A1 | 2/2002 | Kunito et al. |
| 2002/0045453 | A1 | 4/2002 | Juttner et al. |
| 2002/0089998 | A1 * | 7/2002 | Le ............ 370/465 |
| 2002/0099663 | A1 | 7/2002 | Yoshino et al. |
| 2002/0108121 | A1 | 8/2002 | Alao et al. |
| 2002/0137498 | A1 | 9/2002 | Goss et al. |
| 2003/0067314 | A1 | 4/2003 | Kaukko |
| 2003/0138050 | A1 | 7/2003 | Yamada et al. |
| 2003/0187920 | A1 | 10/2003 | Redkar |
| 2003/0214775 | A1 | 11/2003 | Fukuta et al. |
| 2004/0095316 | A1 | 5/2004 | Shibamiya et al. |
| 2004/0203705 | A1 | 10/2004 | Lundby |
| 2004/0208119 | A1 * | 10/2004 | Christodoulou et al. ...... 370/228 |
| 2004/0232770 | A1 | 11/2004 | Gisy et al. |
| 2005/0044229 | A1 | 2/2005 | Brown et al. |
| 2005/0238148 | A1 | 10/2005 | Poustchi et al. |
| 2005/0240467 | A1 | 10/2005 | Eckart et al. |
| 2005/0271080 | A1 | 12/2005 | Gorman |
| 2006/0064750 | A1 | 3/2006 | Kersey et al. |
| 2006/0121916 | A1 | 6/2006 | Aborn et al. |
| 2007/0088818 | A1 | 4/2007 | Roberts et al. |
| 2007/0094279 | A1 | 4/2007 | Mittal et al. |

OTHER PUBLICATIONS

U.S. Official Action dated Aug. 19, 2011 in U.S. Appl. No. 12/909,145.
U.S. Notice of Allowance dated Nov. 14, 2011 in U.S. Appl. No. 12/642,288.
U.S. Office Action dated Jan. 30, 2012 in U.S. Appl. No. 11/952,510.
U.S. Office Action dated Feb. 3, 2012 in U.S. Appl. No. 12/909,145.
U.S. Notice of Allowance dated May 17, 2011 in U.S. Appl. No. 12/639,448.
U.S. Official Action dated Jun. 17, 2011 in U.S. Appl. No. 12/642,288.
U.S. Office Action dated May 22, 2012 in U.S. Appl. No. 12/874,450.
U.S. Office Action dated Jun. 11, 2012 in U.S. Appl. No. 12/909,145.
U.S. Official Action dated Jun. 26, 2012 in U.S. Appl. No. 12/759,767.
U.S. Office Action dated Oct. 11, 2012 in U.S. Appl. No. 12/854,475.
U.S. Office Action dated Nov. 14, 2012 in U.S. Appl. No. 12/874,450.
U.S. Office Action dated Dec. 5, 2012 in U.S. Appl. No. 11/952,510.
U.S. Notice of Allowance dated Nov. 16, 2012 in U.S. Appl. No. 12/759,767.
U.S. Office Action dated Nov. 21, 2012 in U.S. Appl. No. 12/909,145.

* cited by examiner

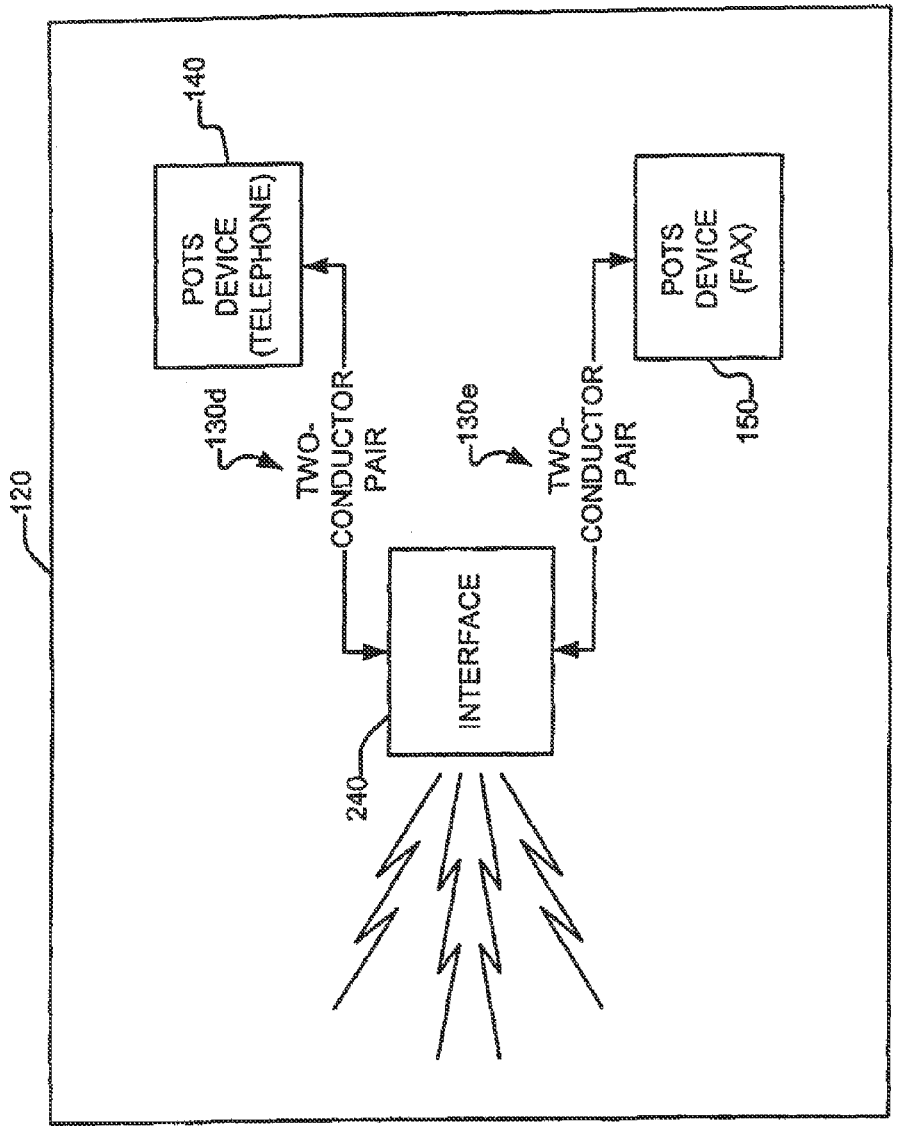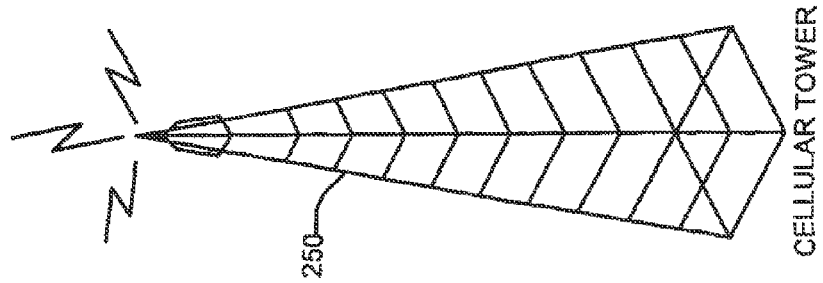
FIG. 2

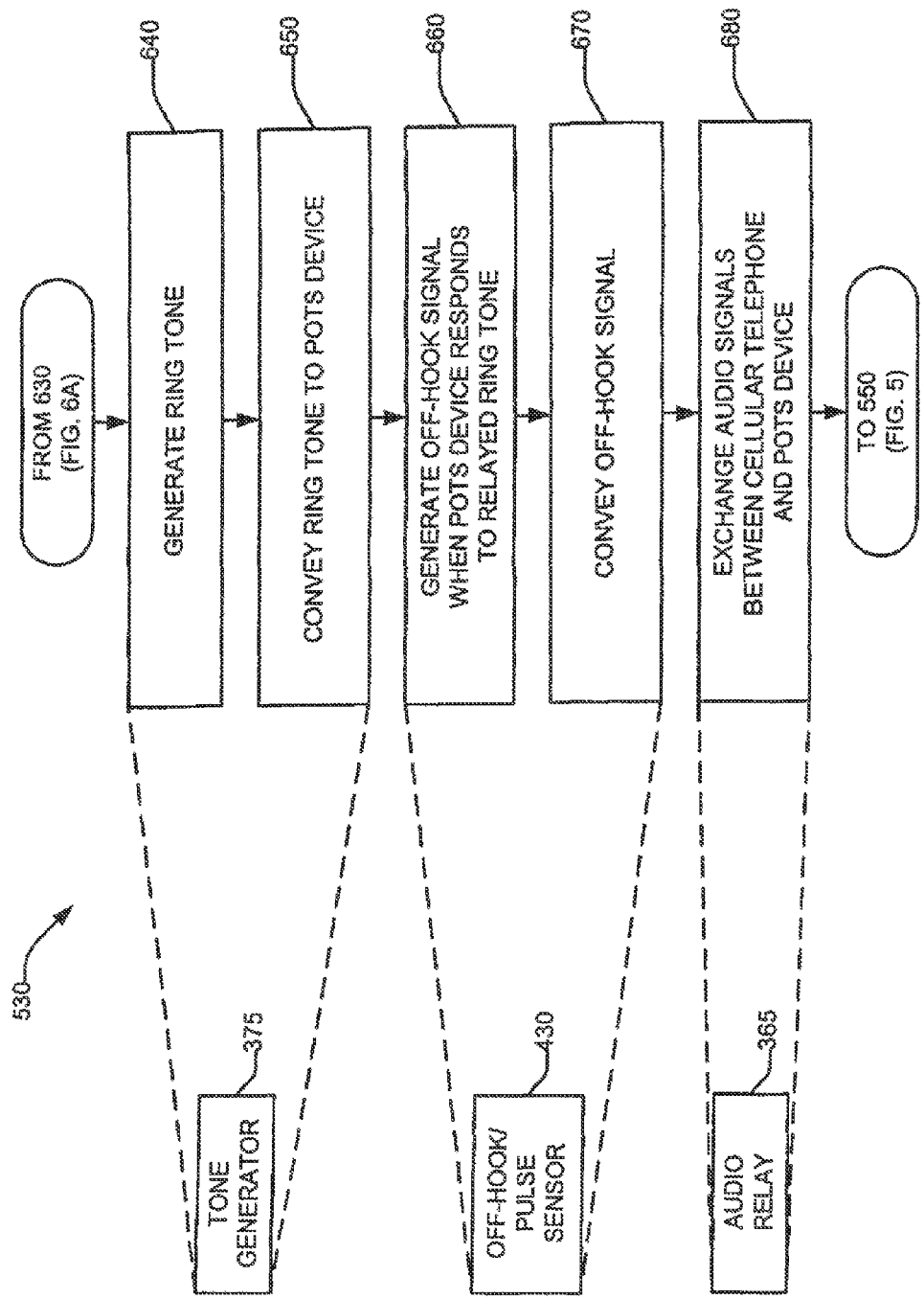

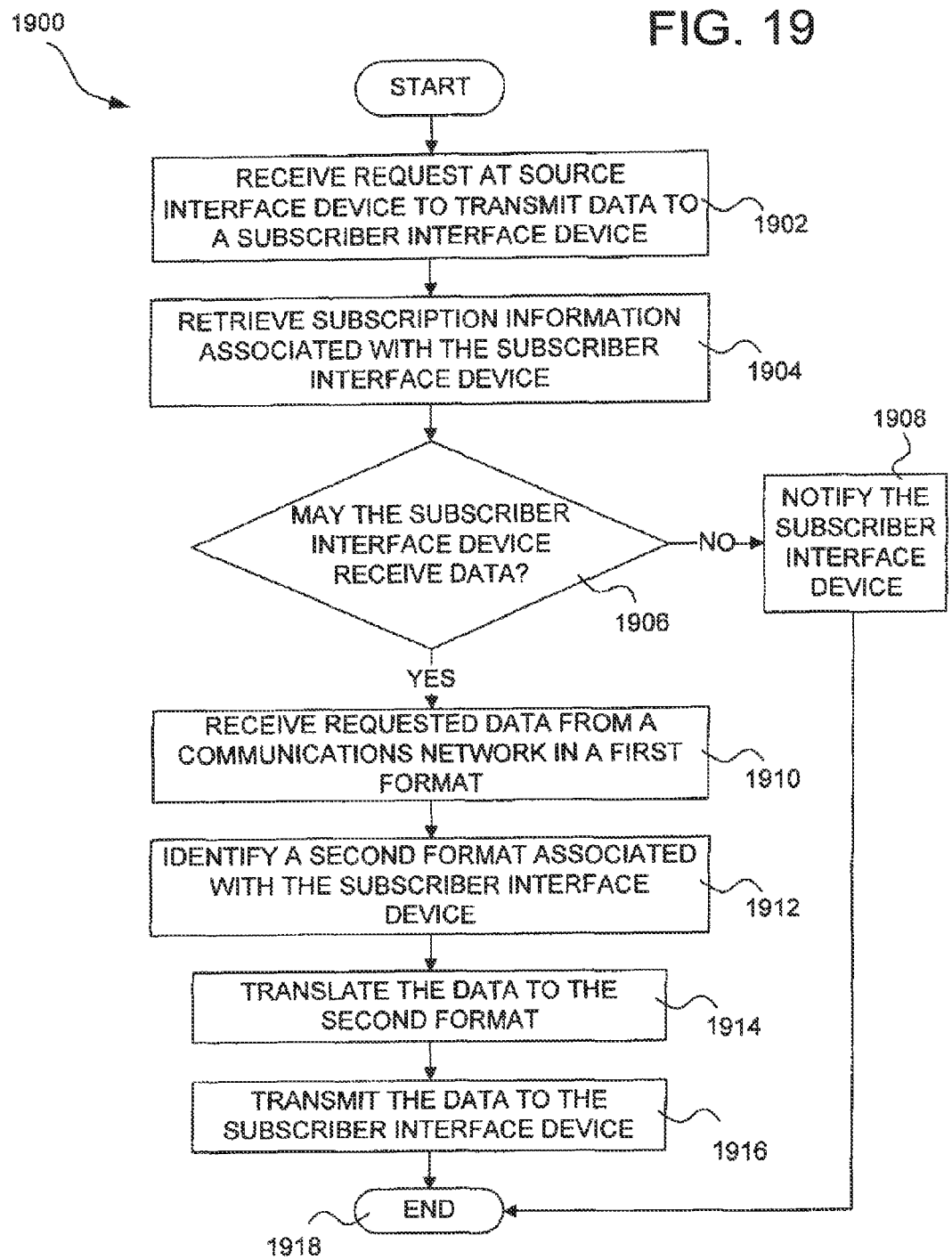

INTERFACE DEVICES FOR FACILITATING COMMUNICATIONS BETWEEN DEVICES AND COMMUNICATIONS NETWORKS

CROSS REFERENCE TO RELATED APPLICATIONS

This application is a continuation of co-pending U.S. patent application Ser. No. 11/324,034, now abandoned, filed Dec. 30, 2005 entitled "Interface Devices for Facilitating Communications Between Devices and Communications Networks", which is a Continuation-In-Part Patent Application of the U.S. Pat. No. 7,194,083, entitled "System and Method for Interfacing Plain Old Telephone System (POTS) Devices with Cellular Networks," filed on Jul. 15, 2002. These applications are herein incorporated by reference in their entirety.

This patent applications is related to the following U.S. patents and copending U.S. patent applications: U.S. Pat. No. 7,623,654, entitled "Systems and Methods for Interfacing Telephony Devices with Cellular and Computer Networks," filed on Aug. 30, 2004; U.S. Pat. No. 7,522,722, entitled "System and Method for Interfacing Plain Old Telephone System (POTS) Devices with Cellular Devices in Communication with a Cellular Network," filed on Aug. 30, 2004; U.S. Pat. No. 7,200,424, entitled "Systems and Methods for Restricting the Use and Movement of Telephony Devices," filed on Aug. 30, 2004; U.S. Pat. No. 7,623,653, entitled "Systems and Methods for Passing Through Alternative Network Device Features to Plain Old Telephone System (POTS) Devices," filed on Aug. 30, 2004; U.S. Pat. No. 7,363,034, entitled "Cellular Docking Station," filed on Dec. 30, 2005; U.S. patent application Ser. No. 11/323,180, now adandoned, entitled "Apparatus, Method, and Computer-Readable Medium for Interfacing Communications Devices," filed on Dec. 30, 2005; U.S. patent application Ser. No. 11/323,820, now abandoned, entitled "Apparatus, Method, and Computer-Readable Medium for Interfacing Devices with Communications Networks," filed on Dec. 30, 2005; U.S. patent application Ser. No. 11/323,825, now abandoned, entitled "Apparatus and Method for Providing a User Interface for Facilitating Communications Between Devices," filed on Dec. 30, 2005; U.S. patent application Ser. No. 11/324,034, now abandoned, entitled "Plurality of Interface Devices for Facilitating Communications Between Devices and Communications Networks," filed on Dec. 30, 2005; U.S. patent application Ser. No. 11/323,182, now abandoned, entitled "Apparatus and Method for Providing Communications and Connection-Oriented Services to Devices," filed on Dec. 30, 2005; U.S. patent application Ser. No. 11/323,185, now abandoned, entitled "Apparatus and Method for Prioritizing Communications Between Devices," filed on Dec. 30, 2005; U.S. patent application Ser. No. 11/324,149, now abandoned, entitled "Apparatus, Method, and Computer-Readable Medium for Communication Between and Controlling Network Devices," filed on Dec. 30, 2005; U.S. patent application Ser. No. 11/323,186, now abandoned, entitled "Apparatus and Method for Aggregating and Accessing Data According to User Information," filed on Dec. 30, 2005; U.S. patent application Ser. No. 11/324,033, now abandoned, entitled "Apparatus and Method for Restricting Access to Data," filed on Dec. 30, 2005; U.S. patent application Ser. No. 11/323,818, now abandoned, entitled "Apparatus and Method for Providing Emergency and Alarm Communications," filed on Dec. 30, 2005; and U.S. patent application Ser. No. 11/324,154, now abandoned, entitled "Apparatus and Method for Testing Communication Capabilities of Networks and Devices," filed on Dec. 30, 2005. Each of the U.S. patent applications listed in this section is herein incorporated by reference in its entirety.

TECHNICAL FIELD

The exemplary embodiments relate generally to telecommunications and, more particularly, to interface devices for facilitating communications between devices and communications networks.

BACKGROUND

Emerging communications network protocols and solutions, such as Voice over Internet Protocol (VoIP) and WI-FI, allow individuals to use VoIP and WI-FI compatible devices to communicate with each other over wide area networks, such as the Internet, in the same manner in which they currently communicate over the Public Switched Telecommunications Network (PSTN). However, in most instances, owners of legacy devices such as cellular telephones and Plain Old Telephone System (POTS) devices which are compatible with cellular networks and the PSTN are not capable of interfacing these devices to networks associated with the emerging communications network protocol and solutions. Thus, legacy device owners are inconvenienced by having multiple devices that lack functionality with the emerging communications network protocols and solutions. Owners of legacy devices cannot convert data sent via the emerging communications network protocols and solutions to formats compatible with the legacy devices. Moreover, users cannot dictate which devices should receive data and in what format the devices should receive the data. There is additionally no flexibility built into legacy systems that allows for receiving the data even when primary means for receiving the data is lost or for allowing devices to share features and functionality.

SUMMARY

In accordance with exemplary embodiments, the above and other problems are solved by providing an apparatus, method, and computer-readable medium for providing a plurality of interface devices for facilitating communications between devices and networks. According to one aspect, a destination interface device provides communications between a first device and a second device. The destination interface device has an input for receiving data in a first format from the first device via a source interface device. Logic within the destination interface device is configured to identify a second device for receiving the data. The logic identifies a second format that is compatible with the second device and translates the data to the second format. The destination interface device further has an output for transmitting the translated data to the second device.

The logic within the destination interface device may be further configured to determine whether the data can be received from the first device via the source interface device. If the data can be received via the source interface device, the data is received at the input of the destination interface device. If the data cannot be received via the source interface device, then the logic detects a substitute source interface device for receiving the data from the first device. The data is then received from the first device via the substitute source interface face device.

According to another aspect, an interface device provides for communications between a first device and a second device. The interface device has an input for receiving data in a first format from the first device. Logic within the interface device determines whether the data can be received from the first device. If the data can be received from the first device, then the data is received at the input of the interface device. If the data cannot be received from the first device, then the logic is configured for detecting a source interface device for transmitting the data to the input of the interface device. A request is sent from the interface device to the source interface device for the data. The data is received at the input of the interface device. The second device for receiving the data is identified, as well as a second format compatible with the second device. The data is translated to the second format and transmitted to the second device via an output of the interface device.

According to yet another aspect, a method provides communications between a first communications network and a destination interface device. A request is received at a source interface device from a destination interface device to transmit data from the first communications network to the destination interface device. Subscription information associated with the destination interface device is retrieved to determine whether the destination interface device can access the requested data. If the destination interface device can access the requested data, then the requested data is received in a first format from the first communications network. A second format for transmitting the data to the destination interface device is identified. The data is translated to the second format and transmitted to the destination interface device.

The above-described aspects may also be implemented as a computer-controlled apparatus, a computer process, a computing system, an apparatus, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize exemplary embodiments, will be apparent from a reading of the following detailed description and a review of the associated drawings.

BRIEF DESCRIPTION OF THE DRAWINGS

Many exemplary embodiments can be better understood with reference to the following drawings. The components in the drawings are not necessarily to scale, emphasis instead being placed upon clearly illustrating the principles of the exemplary embodiments. Moreover, in the drawings, like reference numerals designate corresponding parts throughout the several views.

FIG. 2 is a block diagram showing one illustrative embodiment of the system for interfacing POTS devices with cellular networks;

FIGS. 6A and 6B are flowcharts showing one illustrative embodiment of the method associated with the conversion of cellular network compatible signals to POTS compatible signals;

FIG. 19 is a flowchart showing an illustrative embodiment of the method for providing communications between networks via a subscriber interface device and a source interface device.

DETAILED DESCRIPTION

Reference will now be made in detail to the description. While several illustrative embodiments will be described in connection with these drawings, there is no intent to limit it to the illustrative embodiment or illustrative embodiments disclosed therein. On the contrary, the intent is to cover all alternatives, modifications, and equivalents included within the spirit and scope of the embodiments as defined by the claims.

Figure 1:
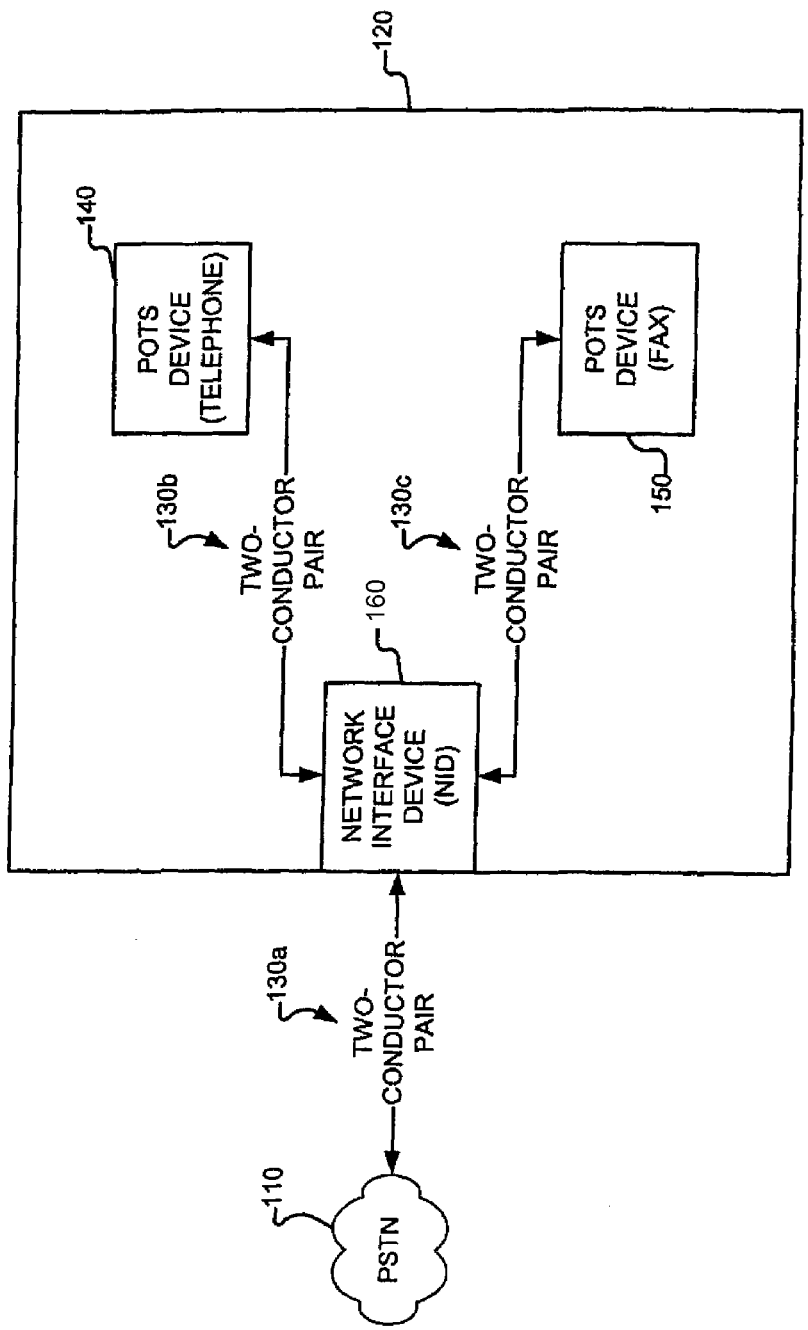
FIG. 1 is a block diagram showing a conventional POTS connection to a telephone company through a network interface device.

FIG. 1 is a block diagram showing a conventional POTS connection to a PSTN 110 through a Network Interface Device (NID) 160. As such connections are well understood by those skilled in the art, only a cursory discussion is presented here. As shown in FIG. 1, several POTS devices 140, 150 occupy a location 120 (e.g., home, business, etc.). Each POTS device 140, 150 is connected to the NID 160 by two-conductor pair wires 130b, 130c, also known as POTS pairs, or twisted pairs. The NID 160 serves as the interface between the POTS devices 140, 150 and the PSTN 110, wherein the NID 160 is connected to the PSTN 110 through at least a two-conductor pair 130a or landline 130a. As evident from FIG. 1, if the landline 130a is severed, or if the landline 130a is unavailable due to geographical limitations, then the POTS devices 140, 150 within the location 120 have no connection to the PSTN 110.

FIG. 2 is a block diagram showing one illustrative embodiment of a system for interfacing POTS devices 140, 150 with cellular networks. As shown in FIG. 2, one or more POTS devices 140, 150 occupy a location 120. However, unlike FIG. 1, the POTS devices 140, 150 in FIG. 2 are configured to communicate with at least one cellular tower 250 through an interface device 240, thereby permitting connection between the POTS devices 140, 150 and a cellular network. In this sense, the POTS devices 140, 150 are connected to the interface device 240, rather than an NID 160 (FIG. 1), by two-conductor pair wires 130d, 130e. Since the interface device 240 is a bridge between the POTS devices 140, 150 and the cellular network, the interface device 240 is configured to receive POTS compatible signals from the POTS devices 140, 150 and convert the POTS compatible signals to cellular network compatible signals, which are transmitted from the interface device 240 to the cellular tower 250. Additionally, the interface device 240 is configured to receive cellular network compatible signals from the cellular tower 250 and convert the cellular network compatible signals to POTS compatible signals, which are then forwarded to the POTS devices 140, 150 for use within the location 120. While a specific PSTN network is not shown in FIG. 2, it will be clear to one of ordinary skill in the art that the cellular tower 250 may be connected to a PSTN network, thereby permitting communication with other PSTN devices.

Figure 3:
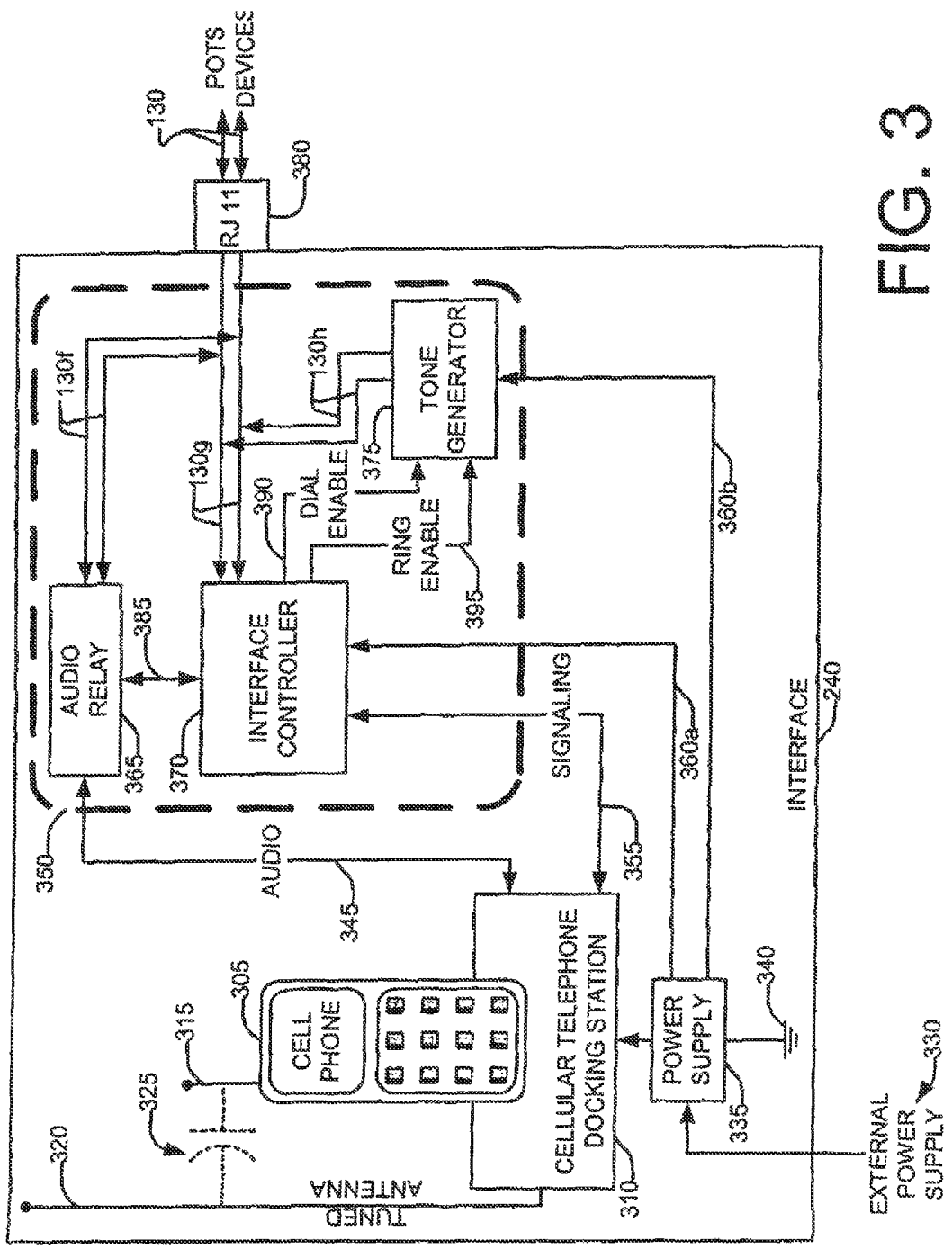
FIG. 3 is a block diagram showing one illustrative embodiment of the interface of FIG. 2.

FIG. 3 is a block diagram showing, in greater detail, a preferred illustrative embodiment of the interface device 240 of FIG. 2. In the preferred illustrative embodiment, the cellular network compatible signals are transmitted and received at the interface device 240 by a cellular telephone 305 while the POTS compatible signals are transmitted and received at the interface device 240 through a POTS connector 380, such as an RJ11 connector 380. Thus, in the preferred illustrative embodiment, the interface device 240 comprises a cellular phone docking station 310 that is configured to interface with the cellular telephone 305, thereby establishing a communications link with the cellular telephone 305. The cellular phone docking station 310 may also have a tuned antenna 320 that is configured to improve transmission and reception by the cellular telephone 305, thereby providing a more robust connection to the cellular network through the cellular tower 250 (FIG. 2). The tuned antenna 320 may be coupled to a cellular telephone antenna 315 in a non-destructive, non-contact, or capacitative manner, for example, using capacitative coupling 325, as shown in FIG. 3. In addition to interfacing with a cellular telephone 305 through one of a variety of conventional connectors (not shown), the cellular phone docking station 310 is configured to receive signaling data through signaling line 355, which may include commands associated with outgoing telephone calls. Thus, in one illustrative embodiment, the signaling data on signaling line 355 may be indicative of a telephone number.

The received signaling data on signaling line 355 is conveyed to the cellular telephone 305 by the cellular phone docking station 310, thereby permitting control over certain operations of the cellular telephone 305 using the signaling data on signaling line 355. In conveying the signaling data on signaling line 355, the cellular phone docking station 310 may modify the signaling data on signaling line 355 appropriately (e.g., amplify, attenuate, reformat, etc.), or, alternatively, the cellular phone docking station 310 may relay the signaling data on signaling line 355 without modification. Regardless of whether or not the signaling data on signaling line 355 is modified, several aspects of the conveyed signal are discussed below, in greater detail, with reference to other components 350 associated with the interface device 240. Although the term line is used to describe various non-limiting embodiments, one skilled in the art will be aware that in some embodiments a line carrying signals may be a path on a separate communication media from other signals while the line carrying signals in other embodiments may be a path on a communications media into which many different signals are multiplexed using various multiplexing techniques understood to one of ordinary skill in the art. Furthermore, in other embodiments, the signals may be carried by wireless communication media.

In addition to the cellular phone docking station 310, the interface device 240 comprises an interface controller 370, an audio relay 365, a tone generator 375, and a power supply 335. The audio relay 365 is configured to exchange analog-audio signals 345 between the POTS devices 140, 150 (FIG. 2) and the cellular phone docking station 310. In this sense, for incoming analog-audio signals 345 (i.e., audio from the cellular telephone 305 to the POTS devices 140, 150 (FIG. 2), the audio relay 365 receives analog-audio signals 345 from the cellular phone docking station 310 and transmits the analog-audio signals 345 to the POTS devices 140, 150 (FIG. 2) through the POTS connector (e.g., RJ11 connector) 380. Similarly, for outgoing analog-audio signals 345 (i.e., audio from the POTS devices 140, 150 (FIG. 2) to the cellular telephone 305), the analog audio signals 345 are received by the audio relay 365 through the POTS connector 380 and transmitted to the cellular phone docking station 310. Thus, the audio relay 365 provides a bi-directional communication link for the analog-audio signals 345 between the POTS devices 140, 150 (FIG. 2) and the cellular phone docking station 310. In a preferred illustrative embodiment, the audio relay 365 is also configured to either amplify or attenuate the analog-audio signals 345 in response to audio-control signals 385 generated by the interface controller 370. Thus, the behavior of the audio relay 365 is governed by the interface controller 370, which is discussed in greater detail below.

The tone generator 375 is configured to generate certain tones that are used by the POTS devices 140, 150 (FIG. 2). For example, when there is an incoming telephone call, the POTS devices 140, 150 (FIG. 2) "ring" to indicate the presence of the incoming telephone call. The tone generator 375, in such instances, is configured to generate a ring tone, which is then transmitted to the POTS devices 140, 150 (FIG. 2) through the POTS connector 380. The transmitted ring tone indicates to the POTS devices 140, 150 (FIG. 2) that they should "ring," thereby notifying the user of the incoming telephone call. The ring tone is generated in response to a ring enable signal on ring enable line 395, which is discussed below with reference to the interface controller 370.

In another example, when a user picks up a POTS telephone 140 (FIG. 2), a dial-tone is produced at the POTS telephone 140 (FIG. 2). The tone generator 375 is configured to generate the dial tone and transmit the generated dial tone to the POTS telephone 140 (FIG. 2). The dial tone is generated in response to a dial enable signal on dial enable line 390, which is also discussed below with reference to the interface controller 370.

The power supply 335 is configured to provide the components of the interface device 240 with the requisite power. In this sense, the power supply 335 is connected to an external power supply 330 from which it receives external power. The external power is converted by the power supply 335 to a DC voltage, which is used to power the cellular phone docking station 310, the tone generator 375, the interface controller 370, and any other device in the interface device 240 that may be powered by a DC source.

The interface controller 370 is configured to control the behavior of the audio relay 365, the tone generator 375, and the cellular phone docking station 310 during the conversion of POTS compatible signals to cellular network compatible signals, and vice versa. Thus, when an outgoing telephone call is placed by one of the POTS devices 140, 150 (FIG. 2), the interface controller 370 receives the dialed numbers and converts the dialed numbers to a digital command. The digital command is transmitted as signaling data on signaling line 355 from the interface controller 370 to the cellular phone docking station 310, which, in turn, transmits the signaling data on signaling line 355 to the cellular telephone 305. The signaling data, therefore, 355 instructs the cellular telephone 305 to dial the number. In one illustrative embodiment, when the number has been dialed and the called party picks up the phone, the cellular telephone 305 detects the connection and conveys an analog-audio signal 345 to the audio relay 365. In this illustrative embodiment, the audio relay 365 subsequently indicates to the interface controller 370 that the call is connected, and the interface controller 370 generates an audio-control signal 385, thereby enabling bi-directional audio communication of analog-audio signals 345 (i.e., talking between the connected parties) through the audio relay 365. If the party on the POTS telephone 140 (FIG. 2) disconnects (i.e., hangs up the phone), then the disconnect is detected by the interface controller 370 through the POTS connector 380. In this illustrative embodiment, the interface controller 370 generates another audio-control signal 385 in response to the disconnect, thereby disabling the audio relay 365 and terminating the bi-directional audio communication between the POTS telephone 140 (FIG. 2) and the cellular telephone 305. The interface controller 370 further generates, in response to the disconnect, signaling data on signaling line 355, which instructs the cellular telephone 305 to stop transmission and reception. If, on the other hand, the cellular telephone 305 disconnects, then this is detected by the audio relay 365 in one illustrative embodiment. The audio relay 365, in turn, transmits the disconnect information to the interface controller 370, and the interface controller 370 subsequently generates the audio-control signal 385 to disable the audio relay 365.

In another illustrative embodiment, information relating to the connected call is transmitted to the interface controller 370 as signaling data on signaling line 355, rather than as an analog-audio signal 345. In this illustrative embodiment, the cellular telephone 305 generates signaling data on signaling line 355 when the connection is established. The signaling data on signaling line 355 is received by the interface controller 370, which generates an audio-control signal 385 in response to the received signaling data on signaling line 355. The audio-control signal 385 enables the audio relay 365, thereby permitting bi-directional audio communication between the POTS telephone 140 (FIG. 2) and the cellular telephone 305. If the party on the POTS telephone 140 (FIG. 2) disconnects (i.e., hangs up the phone), then the disconnect is detected by the interface controller 370 through the POTS connector 380. The interface controller 370 subsequently generates an audio-control signal 385 to disable the audio relay 365, thereby terminating the bi-directional audio communication between the POTS telephone 140 (FIG. 2) and the cellular telephone 305. If, however, the cellular telephone 305 disconnects, then the cellular telephone 305, in this illustrative embodiment, generates signaling data on signaling line 355 indicative of the disconnected call. The generated signaling data on signaling line 355 is transmitted to the interface controller 370, which subsequently generates an audio-control signal 385 to disable the audio relay 365.

In the case of an incoming telephone call, the cellular telephone 305 detects the incoming telephone call and conveys this information to the interface controller 370. In one illustrative embodiment, the information is conveyed to the interface controller 370 through the audio relay 365. Thus, in this illustrative embodiment, the incoming telephone call generates an analog-audio signal 345 at the cellular telephone 305. The analog-audio signal 345 is transmitted from the cellular telephone 305 to the audio relay 365 through the cellular phone docking station 310, and the audio relay 365 then indicates to the interface controller 370 that there is an incoming call. The interface controller 370 receives this information and generates a ring enable signal on ring enable line 395. The ring enable signal on ring enable line 395 is received by the tone generator 375, which generates the ring tone in response to the ring enable signal on ring enable line 395. The ring tone makes the POTS devices 140, 150 (FIG. 2) "ring." When one of the POTS devices 140, 150 (FIG. 2) is picked up and a connection is established, the interface controller 370 detects the established call and generates signaling data on signaling line 355, which indicates to the cellular telephone 305 that the connection is established. Additionally, the interface controller 370 generates an audio-control signal 385, which enables the audio relay 365 for bi-directional audio communication between the POTS device 140, 150 (FIG. 2) and the cellular telephone 305. When the call ends, the system disconnects as described above.

In another illustrative embodiment, the information is conveyed to the interface controller 370 through signaling data on signaling line 355. Thus, in this illustrative embodiment, when the cellular telephone 305 detects an incoming telephone call, it generates signaling data on signaling line 355. The signaling data on signaling line 355 is transmitted to the interface controller 370, thereby indicating that there is an incoming call. The interface controller 370 receives this information and generates a ring enable signal on ring enable line 395. The ring enable signal on ring enable line 395 is received by the tone generator 375, which generates the ring tone in response to the ring enable signal on ring enable line 395. The tone makes the POTS devices 140, 150 (FIG. 2) "ring." When one of the POTS devices 140, 150 (FIG. 2) is picked up and a connection is established, the interface controller 370 detects the established call and generates signaling data on signaling line 355, which indicates to the cellular telephone 305 that the connection is established. Additionally, the interface controller 370 generates an audio-control signal 385, which enables the audio relay 365 for bi-directional audio communication between the POTS device 140, 150 (FIG. 2) and the cellular telephone 305. When the call ends, the system disconnects as described above.

Figure 4:
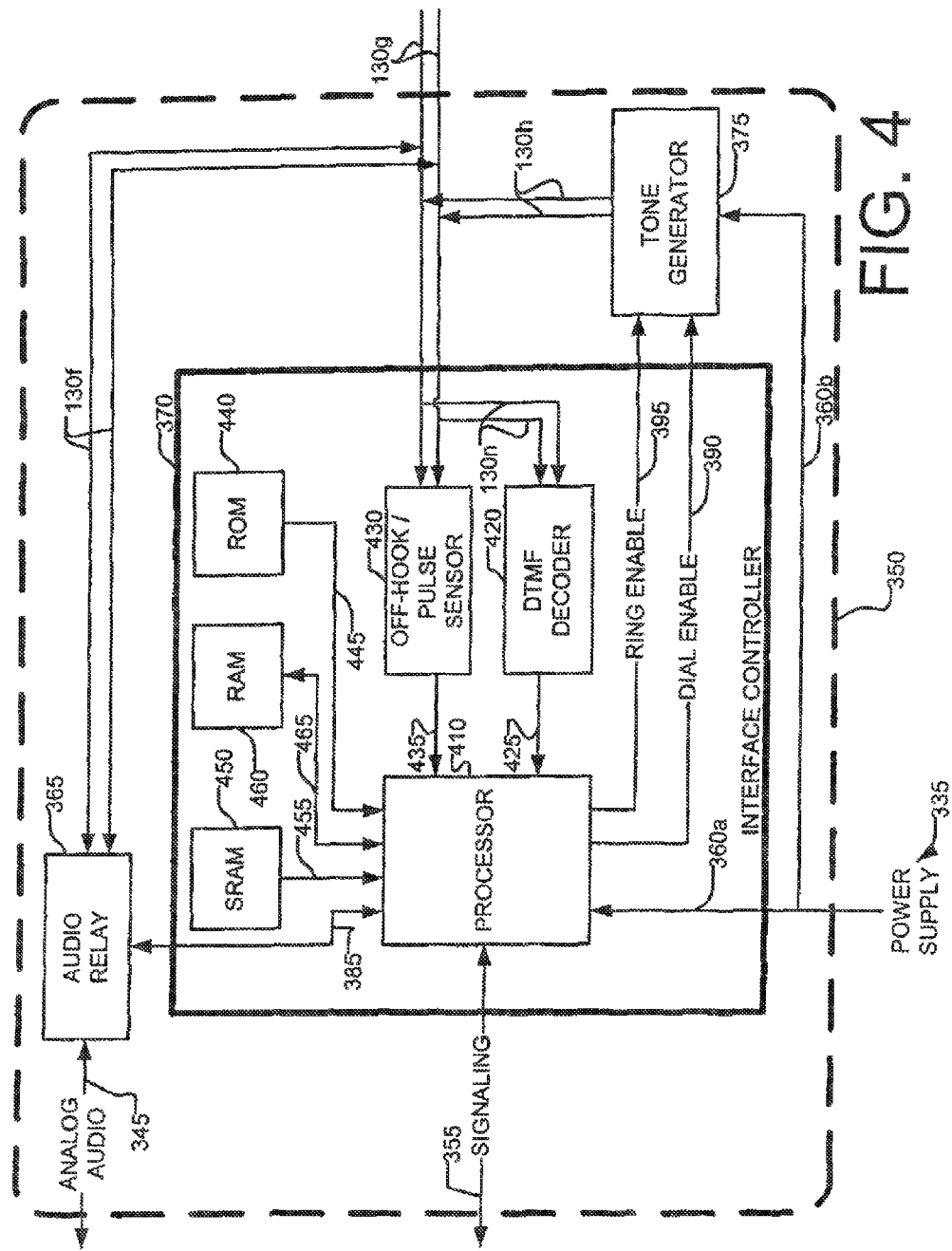
FIG. 4 is a block diagram showing one illustrative embodiment of the hardware within the interface of FIG. 3.

FIG. 4 is a block diagram showing the interface controller 370 of FIG. 3 in greater detail. The interface controller 370 is shown in FIG. 4 as comprising a processor 410, random-access memory (RAM) 460, read-only memory (ROM) 440, Static-Random-Access Memory (SRAM) 450, an off-hook/pulse sensor 430, and a Dual-Tone Multi-Frequency (DTMF) decoder 420. The ROM 440 is configured to store the instructions that run the interface controller 370. In this sense, the ROM 440 is configured to store the program that controls the behavior of the interface controller 370, thereby allowing the interface controller 370 to convert POTS compatible signals to cellular network compatible signals, and vice versa. The SRAM 450 is adapted to store configuration information, such as whether the system is amenable to 10-digit dialing or 7-digit dialing, international calling protocols, etc. Thus, the SRAM 450 may be adapted differently for systems that are used in different geographical areas, or systems that use different calling protocols. The RAM 460 is configured to store temporary data during the running of the program by the processor 410. The processor is configured to control the operation of the off-hook/pulse sensor 430, the DTMF decoder 420, the tone generator 375, and the audio relay 365 in accordance with the instructions stored in ROM 440. Additionally, the processor 410 is configured to generate signaling data on signaling line 355, which may instruct the cellular telephone 305 (FIG. 3) to dial a number, disconnect a call, etc. Several of these functions are discussed in detail below with reference to the off-hook/pulse sensor 430 and the DTMF decoder 420.

The off-hook/pulse sensor 430 is configured to detect when any of the POTS devices 140, 150 (FIG. 2) are off-hook and generate an off-hook signal 435 when a POTS device 140, 150 (FIG. 2) is detected as being off-hook. In this sense, the off-hook/pulse sensor 430 is connected to the POTS connector 380 (FIG. 3) through the two-conductor pair wires 130g. Thus, when any of the POTS devices 140, 150 (FIG. 2) connected to the two-conductor pair 130 go off-hook, the off-hook is detected by the off-hook/pulse sensor 430, which is also connected to the two-conductor pair 130. The off-hook/pulse sensor 430 generates an off-hook signal 435 after detecting that a POTS device 140, 150 (FIG. 2) is off-hook, and subsequently transmits the off-hook signal 435 to the processor 410. If the POTS device 140, 150 (FIG. 2) is receiving an incoming call, then the off-hook signal 435 indicates that the POTS device 140, 150 (FIG. 2) has "picked up" the incoming call, thereby alerting the processor 410 that the processor 410 should establish a bi-directional audio connection between the cellular telephone 305 (FIG. 3) and the POTS device 140, 150 (FIG. 2). If, on the other hand, the POTS device 140, 150 (FIG. 2) is placing an outgoing call, then the off-hook signal 435 alerts the processor 410 that a phone number will soon follow. In either event, the off-hook/pulse sensor 430 transmits the off-hook signal 435 to the processor 410, which, in turn, generates signaling data on signaling line 355 indicative of the POTS device 140, 150 (FIG. 2) being off-hook. The signaling data on signaling line 355 is then conveyed, either with or without modification, to the cellular telephone 305 through the cellular phone docking station 310.

The off-hook/pulse sensor 430 is further configured to detect dialing from POTS devices 140, 150 (FIG. 2) that are configured for pulse dialing. Since pulse dialing emulates rapid sequential off-hook signals, the off-hook/pulse sensor 430 receives pulses (i.e., the rapid sequential off-hook signals) and produces a sequence of off-hook signals 435 or pulse-dialing signals. The sequence of off-hook signals 435 is relayed to the processor 410, which converts the sequence of off-hook signals into signaling data on signaling line 355 that is indicative of the dialed number. The signaling data on signaling line 355 is transmitted from the processor 410 to the cellular telephone 305 through the cellular phone docking station 310. The cellular telephone 305, after receiving the signaling data on signaling line 355, dials the number indicated by the signaling data on signaling line 355, thereby permitting phone calls by the POTS devices 140, 150 (FIG. 2) through the cellular network. In one illustrative embodiment, the numbers dialed by the POTS devices 140, 150 (FIG. 2) are stored in RAM 460, and, once a predetermined number of dialed numbers has been stored, the processor 410 conveys the stored numbers and a "send" command to the cellular telephone. In other words, upon receiving enough digits to dial a telephone number, as indicated by the configuration information in SRAM 450, the processor 410 commands the cellular telephone 305 to dial the outgoing number, thereby connecting a call from the POTS device 140, 150 (FIG. 2) through the cellular network. In another illustrative embodiment, the RAM 460 stores numbers as they are dialed by the POTS devices 140, 150 (FIG. 2). If, during dialing, the processor 410 detects a delay or a pause, then the processor 410 presumes that all of the digits of the telephone number have been dialed. Thus, the processor 410 commands the cellular telephone 305 to dial the outgoing number, thereby connecting the call from the POTS device 140, 150 (FIG. 2) through the cellular network.

The DTMF decoder 420 is configured to detect dialing from POTS devices 140, 150 (FIG. 2) that are configured for DTMF or "tone" dialing. The DTMF decoder 420 receives a tone, which represent a number, through the two-conductor pair 130n. After receiving the tone, the DTMF decoder 420 generates a DTMF-dialing signal 425 that is indicative of the number that was dialed. The DTMF-dialing signal 425 is then transmitted to the processor 410, which converts the DTMF-dialing signal 425 into signaling data on signaling line 355 that is indicative of the number that was dialed. The signaling data on signaling line 355 is transmitted from the processor 410 to the cellular telephone 305 through the cellular phone docking station 310. The cellular telephone 305 subsequently dials the number indicated by the signaling data on signaling line 355, thereby allowing the POTS device 140, 150 (FIG. 2) to make a call using the cellular network.

It can be seen, from FIGS. 2 through 4, that the various illustrative embodiments of the system will permit the interfacing of POTS devices 140, 150 (FIG. 2) with a cellular network. Specifically, in one illustrative embodiment, POTS devices 140, 150 (FIG. 2) are interfaced with the cellular network through a cellular telephone 305 (FIG. 3), which is attached to the interface device 240 at a cellular phone docking station 310. In addition to the various systems, as described above, another illustrative embodiment may be seen as a method for interfacing POTS devices 140, 150 (FIG. 2) with cellular networks. Several illustrative embodiments of the method are described with reference to FIGS. 5 through 12 below.

Figure 5:
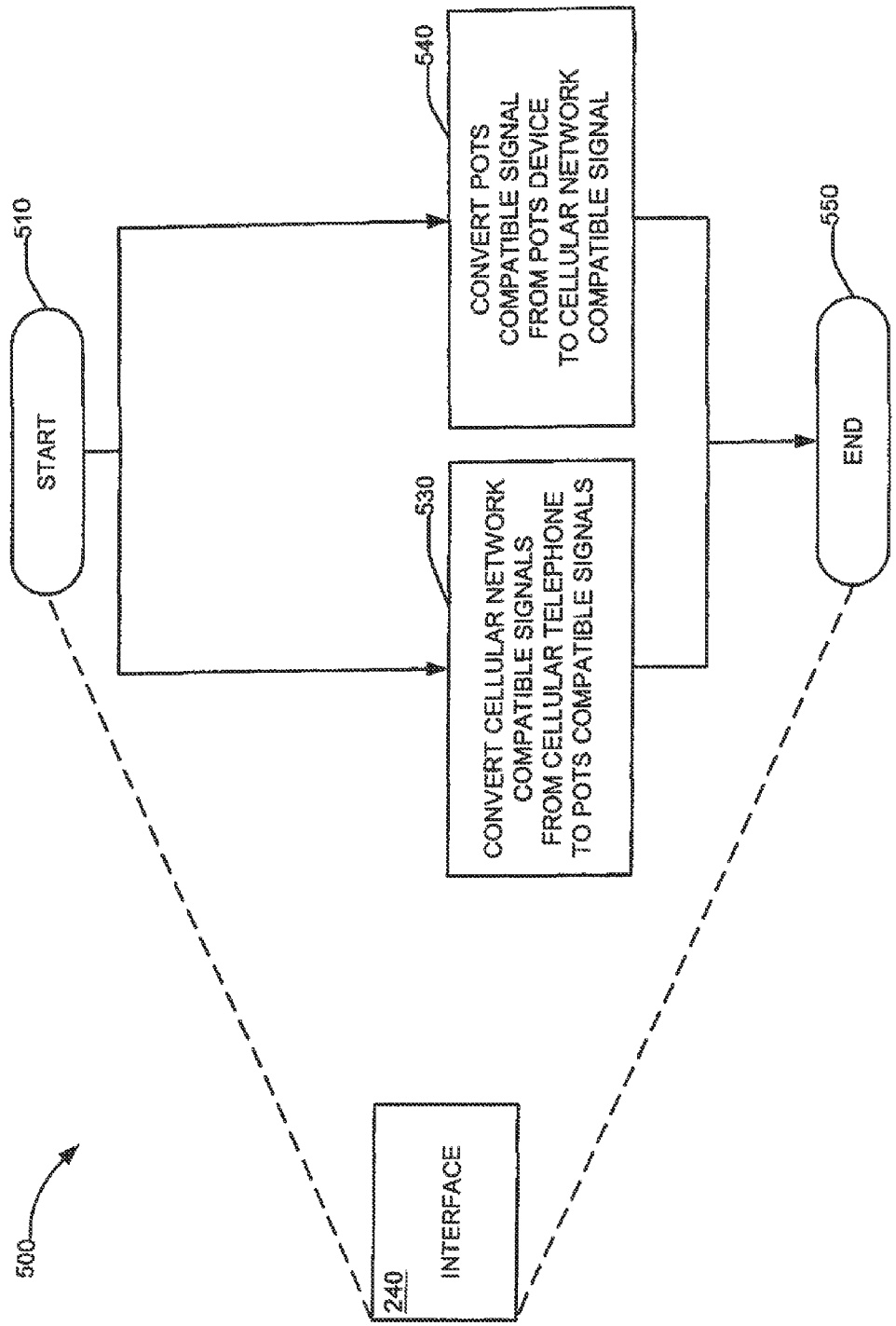
FIG. 5 is a flowchart showing one illustrative embodiment of the method for interfacing POTS devices with cellular networks.

FIG. 5 is a flowchart showing one illustrative embodiment of the method for interfacing POTS devices with cellular networks. In a broad sense, once a POTS device 140, 150 (FIG. 2) has been coupled to a cellular telephone 305 (FIG. 3) through an interface device 240 (FIG. 2), this illustrative embodiment may be seen as converting, in step 530, cellular network compatible signals from the cellular telephone 305 (FIG. 3) to POTS compatible signals, and converting, in step 540, POTS compatible signals from the POTS devices 140, 150 (FIG. 2) to cellular network compatible signals. In a preferred illustrative embodiment, the converting steps 530, 540 are performed at the interface device 240.

Figure 6A:
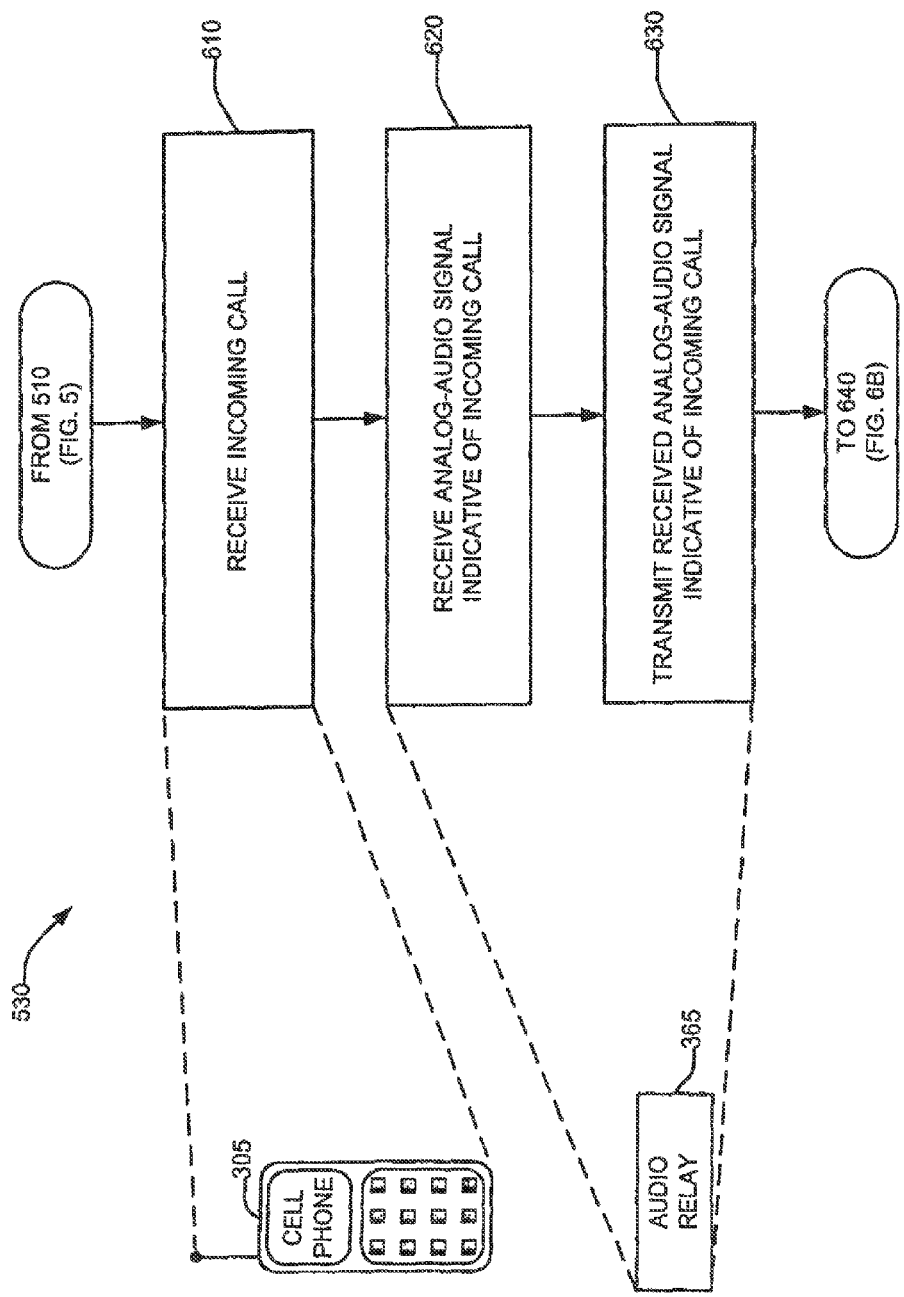

FIGS. 6A and 6B are flowcharts showing one illustrative embodiment of the method associated with the conversion 530 of cellular network compatible signals to POTS compatible signals. As an initial matter, the cellular network compatible signals are received through the cellular telephone 305 (FIG. 3). Thus, in step 610, the system receives an incoming call through the cellular telephone 305 (FIG. 3). Once the incoming call is received in step 610, the system further receives, in step 620, an analog-audio signal 345 (FIG. 3) indicative of the incoming call from the cellular telephone 305 (FIG. 3). The received analog-audio signal 345 (FIG. 3) is then transmitted, in step 630, to an interface controller 370 (FIG. 3). The interface controller 370 (FIG. 3) generates, in step 640, a ring tone in response to receiving the analog-audio signal 345 (FIG. 3). In a preferred illustrative embodiment, the ring tone is generated in step 640 by a tone generator 375 (FIG. 3). The generated 640 ring tone is conveyed, in step 650, to the POTS devices 140, 150 (FIG. 2), and, when the POTS device 140, 150 (FIG. 2) is "picked up," an off-hook signal is generated, in step 660, and conveyed, in step 670, to the interface controller 370 (FIG. 3). This triggers the interface controller 370 (FIG. 3) to activate the audio relay 365 (FIG. 3), and analog-audio signals 345 (FIG. 3) are exchanged, in step 680, between the POTS devices 140, 150 (FIG. 2) and the cellular telephone 305 (FIG. 3) through the audio relay 365 (FIG. 3). Thus, in this illustrative embodiment, once the incoming call is connected between the cellular telephone 305 (FIG. 3) and the POTS device 140, 150 (FIG. 2), the POTS device 140, 150 (FIG. 2) freely communicates through the cellular network.

Figure 7A:
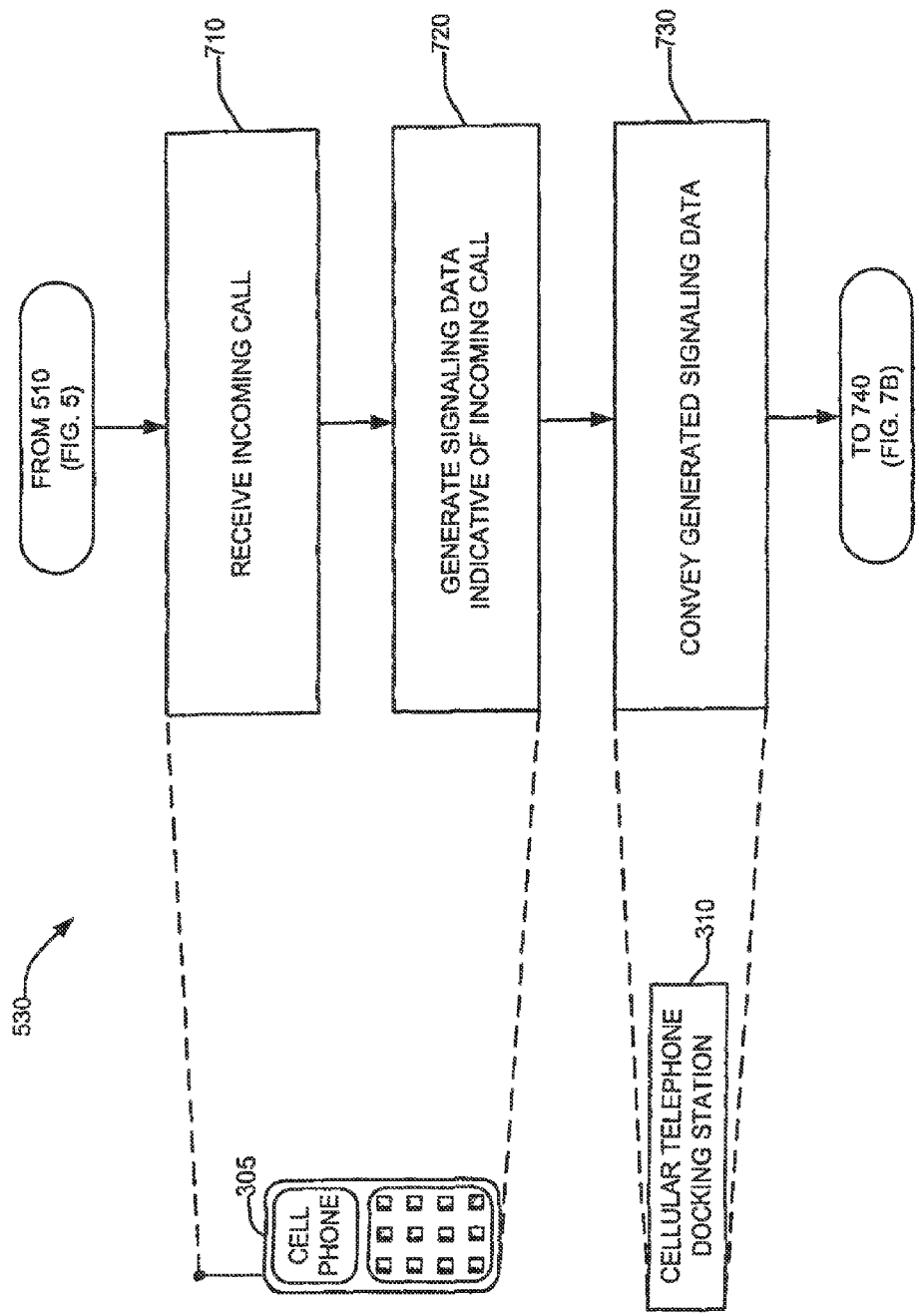
FIGS. 7A and 7B are flowcharts showing another illustrative embodiment of the method associated with the conversion of cellular network compatible signals to POTS compatible signals.
Figure 7B:
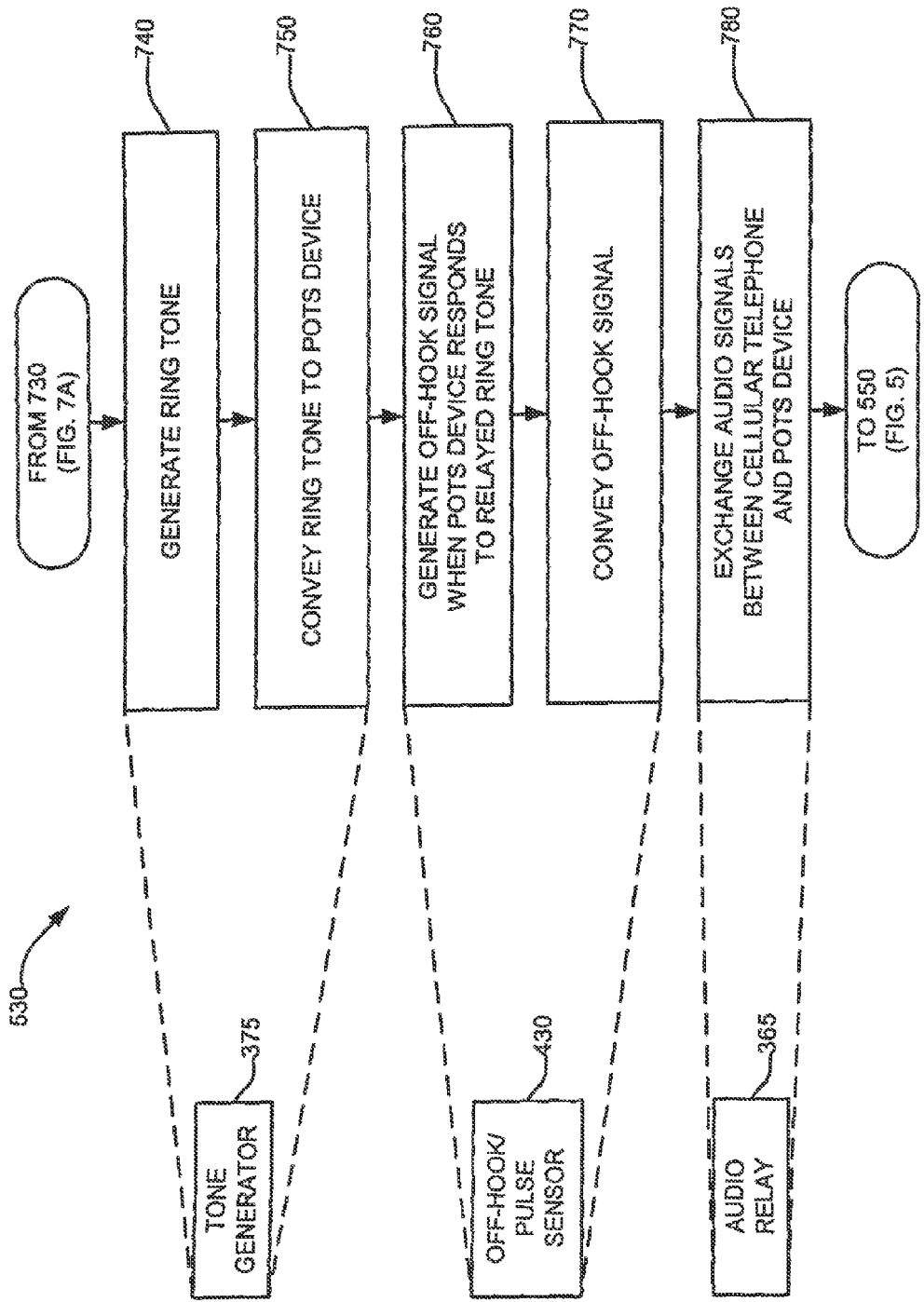

FIGS. 7A and 7B are flowcharts showing another illustrative embodiment of the method associated with the conversion 530 of cellular network compatible signals to POTS compatible signals. Similar to FIGS. 6A and 6B, the cellular network compatible signals here are received through the cellular telephone 305 (FIG. 3). Thus, in step 710, the system receives an incoming call through the cellular telephone 305 (FIG. 3). However, unlike the illustrative embodiment of FIGS. 6A and 6B, once the incoming call is received in step 710, the system generates, in step 720, signaling data on signaling line 355 (FIG. 3) indicative of the incoming call from the cellular telephone 305 (FIG. 3). The generated 720 signaling data on signaling line 355 (FIG. 3) is then conveyed, in step 730, to an interface controller 370 (FIG. 3). The interface controller 370 (FIG. 3) generates, in step 740, a ring tone in response to signaling data on signaling line 355 (FIG. 3). In a preferred illustrative embodiment, the ring tone is generated 740 by a tone generator 375 (FIG. 3). The generated 740 ring tone is conveyed, in step 750, to the POTS devices 140, 150 (FIG. 2), and, when the POTS device 140, 150 (FIG. 2) is "picked up," an off-hook signal is generated, in step 760, and conveyed, in step 770, to the interface controller 370 (FIG. 3). This triggers the interface controller 370 (FIG. 3) to activate the audio relay 365 (FIG. 3), and analog-audio signals 345 (FIG. 3) are exchanged, in step 780, between the POTS devices 140, 150 (FIG. 2) and the cellular telephone 305 (FIG. 3) through the audio relay 365 (FIG. 3). Thus, in this illustrative embodiment, once the incoming call is connected between the cellular telephone 305 (FIG. 3) and the POTS device 140, 150 (FIG. 2), the POTS device 140, 150 (FIG. 2) freely communicates through the cellular network.

Figure 8:
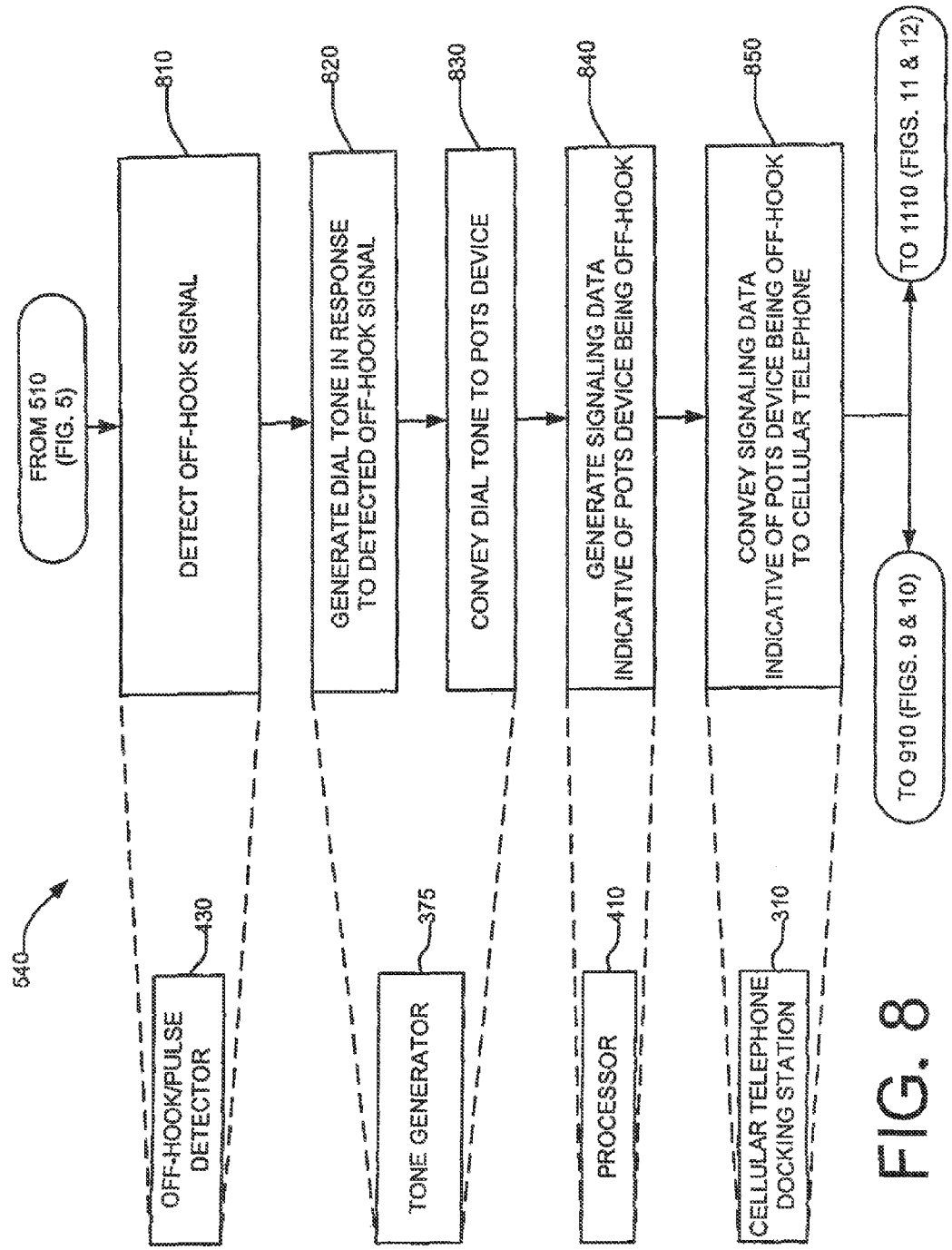
FIG. 8 is a flowchart showing several steps associated with the conversion of POTS compatible signals to cellular network compatible signals.

FIG. 8 is a flowchart showing several steps associated with the conversion 540 of POTS compatible signals to cellular network compatible signals. As described above, the interface device 240 (FIG. 2) is configured to allow outgoing calls using either pulse-dialing or "tone" dialing. The method steps associated with pulse-dialing are different from the method steps associated with "tone" dialing. However, regardless of which type of dialing is employed, both methods share several of the initial steps. FIG. 8 describes the shared initial steps associated with an outgoing call from a POTS device 140, 150 (FIG. 2) through the cellular network. When a user "picks up" the phone 140 (FIG. 2) to place an outgoing call, the system detects, in step 810, an off-hook signal at the off-hook/pulse detector 430 (FIG. 4). The system then generates, in step 820, a dial tone in response to the detected off-hook signal. In an illustrative embodiment, the dial tone is generated 820 by the tone generator 375 (FIG. 3). The generated 820 dial tone is conveyed, in step 830, to the POTS device 140, 150 (FIG. 2) (i.e., to the person that is placing the outgoing call) to indicate that the system is ready for dialing. In addition to generating the 820 dial tone, the system further generates, in step 840, signaling data on signaling line 355 (FIG. 3) that is indicative of the POTS device 140, 150 (FIG. 2) being off-hook. The generated 840 signaling data on signaling line 355 (FIG. 3) is then conveyed, in step 850, to the cellular telephone 305 (FIG. 3), either with or without modification, through the cellular phone docking station 310 (FIG. 3), thereby indicating to the cellular telephone 305 (FIG. 3) that a user has "picked up" the phone 140 (FIG. 2), and that an outgoing call may be initiated. Thus, in one illustrative embodiment, once the cellular phone 305 (FIG. 3) receives the indication that the user has "picked up" the phone 140 (FIG. 2), the cellular telephone 305 (FIG. 3) blocks incoming calls. Hence, at this point, the system is ready for either pulse dialing or "tone" dialing. In another illustrative embodiment, the step of generating 840 signaling data on signaling line 355 (FIG. 3) may be completed.

Figure 9:
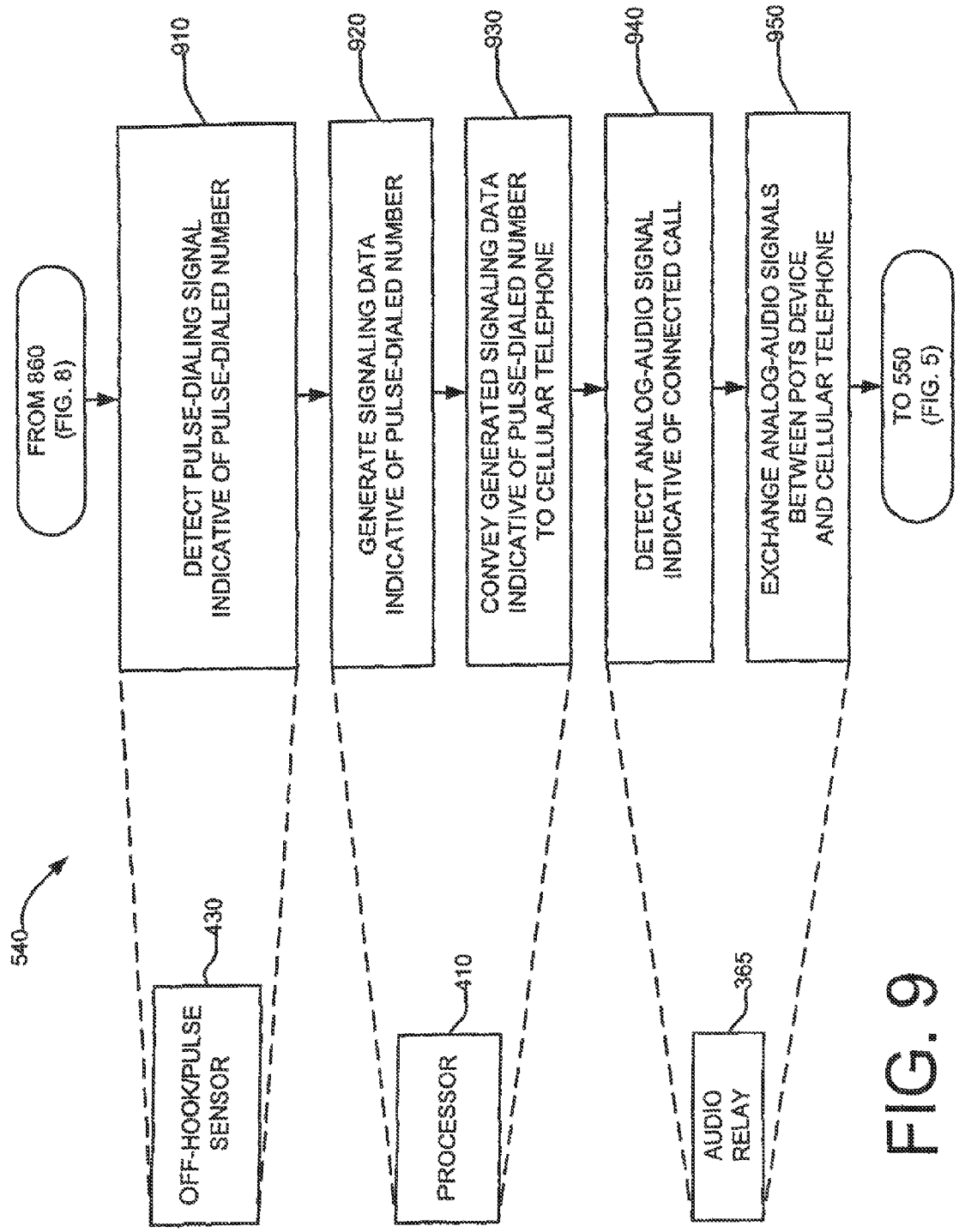
FIGS. 9 through 12 are flowcharts showing several illustrative embodiments of the method associated with the conversion of POTS compatible signals to cellular network compatible signals.
Figure 10:
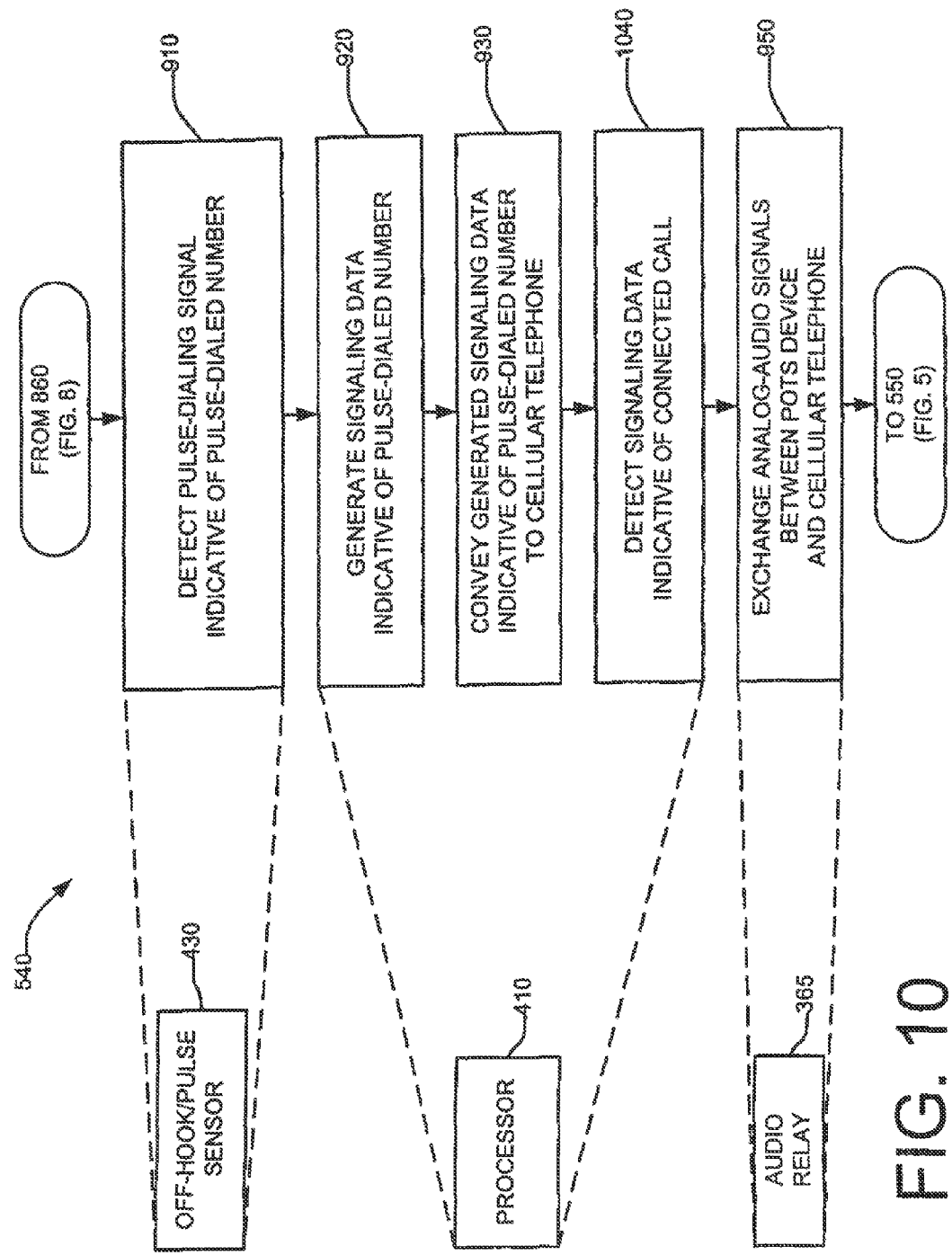

FIGS. 9 and 10 are flowcharts showing several illustrative embodiments of the method associated with pulse dialing. As shown in FIG. 9, in one illustrative embodiment, the off-hook/pulse sensor 430 (FIG. 4) detects, in step 910, a pulse-dialing signal that is indicative of a pulse-dialed number. In response to the pulse-dialing signal, the processor 410 (FIG. 4) generates, in step 920, signaling data on signaling line 355 (FIG. 3) that is indicative of the pulse-dialed number and a "send" command. The signaling data on signaling line 355 (FIG. 3) is conveyed, in step 930, to the cellular telephone 305 (FIG. 3), either with or without modification (e.g., amplification or attenuation), by the processor 410 (FIG. 4) through the cellular phone docking station 310 (FIG. 3).

In one illustrative embodiment, the numbers dialed by the POTS devices 140, 150 (FIG. 2) are stored in RAM 460, and, once a predetermined number of dialed numbers has been stored, the processor 410 (FIG. 4) conveys the stored numbers and a "send" command to the cellular telephone 305 (FIG. 3). In other words, upon receiving enough digits to dial a telephone number, as indicated by the configuration information in SRAM 450 (FIG. 4), the processor 410 (FIG. 4) commands the cellular telephone 305 (FIG. 3) to dial the outgoing number, thereby connecting a call from the POTS device 140, 150 (FIG. 2) through the cellular network. In another illustrative embodiment, the RAM 460 (FIG. 4) stores numbers as they are dialed by the POTS devices 140, 150 (FIG. 2). If, during dialing, the processor 410 (FIG. 4) detects a delay or a pause, then the processor 410 (FIG. 4) presumes that all of the digits of the telephone number have been dialed. Thus, the processor 410 (FIG. 4) commands the cellular telephone 305 to dial the outgoing number, thereby connecting the call from the POTS device 140, 150 (FIG. 2) through the cellular network. The command instructs the cellular telephone 305 (FIG. 3) to call the number that has been conveyed to the cellular telephone 305 (FIG. 3) by the signaling data on signaling line 355 (FIG. 3).

When the called party "picks up" the phone, the system detects, in step 940, an analog-audio signal 345 (FIG. 3) that is indicative of the connected call. At this point, the processor 410 (FIG. 4) enables the audio relay 365 (FIG. 3), and analog-audio signals 345 (FIG. 3) are exchanged, in step 950, between the POTS device 140, 150 (FIG. 2) and the cellular telephone 305 (FIG. 3). Thus, once the outgoing call is connected between the cellular telephone 305 (FIG. 3) and the POTS device 140, 150 (FIG. 2), the POTS device 140, 150 (FIG. 2) freely communicates through the cellular network.

In another illustrative embodiment, rather than waiting for the called party to "pick up" the phone, the system detects an analog-audio signal 345 (FIG. 3) that is indicative of a called-party telephone ringing or a called-party telephone being "busy." At this point, the processor 410 (FIG. 4) enables the audio relay 365 (FIG. 3), and analog-audio signals 345 (FIG. 3) are exchanged between the POTS device 140, 150 (FIG. 2) and the cellular telephone 305 (FIG. 3). Thus, once a called-party telephone ringing or a called-party telephone "busy"

signal is detected, the cellular telephone 305 (FIG. 3) and the POTS device 140, 150 (FIG. 2) are connected through the cellular network.

FIG. 10 is a flowchart showing, in greater detail, another illustrative embodiment of the method associated with pulse dialing. As shown in FIG. 10, the off-hook/pulse sensor 430 (FIG. 4) detects, in step 910, a pulse-dialing signal that is indicative of a pulse-dialed number. In response to the pulse-dialing signal, the processor 410 (FIG. 4) generates, in step 920, signaling data on signaling line 355 (FIG. 3) that is indicative of the pulse-dialed number. The signaling data on signaling line 355 (FIG. 3) is conveyed, in step 930, to the cellular telephone 305 (FIG. 3), either with or without modification, by the processor 410 (FIG. 4) through the cellular phone docking station 310 (FIG. 3). This instructs the cellular telephone 305 (FIG. 3) to call the number that has been conveyed to the cellular telephone 305 (FIG. 3) by the signaling data on signaling line 355 (FIG. 3). When the called party "picks up" the phone, the cellular telephone 305 (FIG. 3) generates signaling data on signaling line 355 (FIG. 3) that is indicative of the connected call, and the processor detects, in step 1040, the signaling data on signaling line 355 (FIG. 3). At this point, the processor 410 (FIG. 4) enables the audio relay 365 (FIG. 3), and analog-audio signals 345 (FIG. 3) are exchanged, in step 950, between the POTS device 140, 150 (FIG. 2) and the cellular telephone 305 (FIG. 3). Thus, again, the POTS device 140, 150 (FIG. 2) freely communicates through the cellular network.

In another illustrative embodiment, rather than waiting for the called party to "pick up" the phone, the system detects an analog-audio signal 345 (FIG. 3) that is indicative of a called-party telephone ringing or a called-party telephone being "busy." At this point, the processor 410 (FIG. 4) enables the audio relay 365 (FIG. 3), and analog-audio signals 345 (FIG. 3) are exchanged between the POTS device 140, 150 (FIG. 2) and the cellular telephone 305 (FIG. 3). Thus, once a called-party telephone ringing or a called-party telephone "busy" signal is detected, the cellular telephone 305 (FIG. 3) and the POTS device 140, 150 (FIG. 2) are connected through the cellular network.

Figure 11:
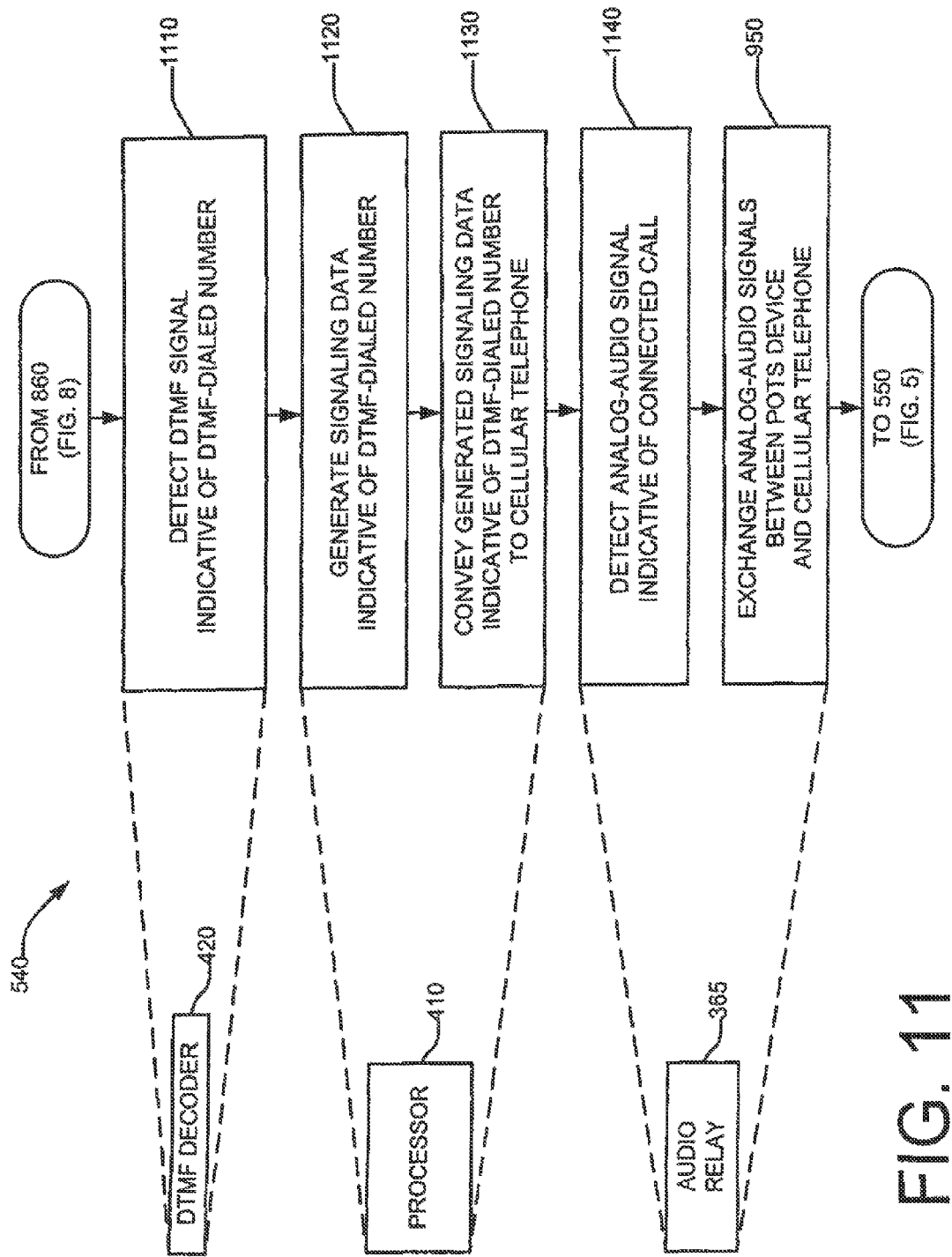
Figure 12:
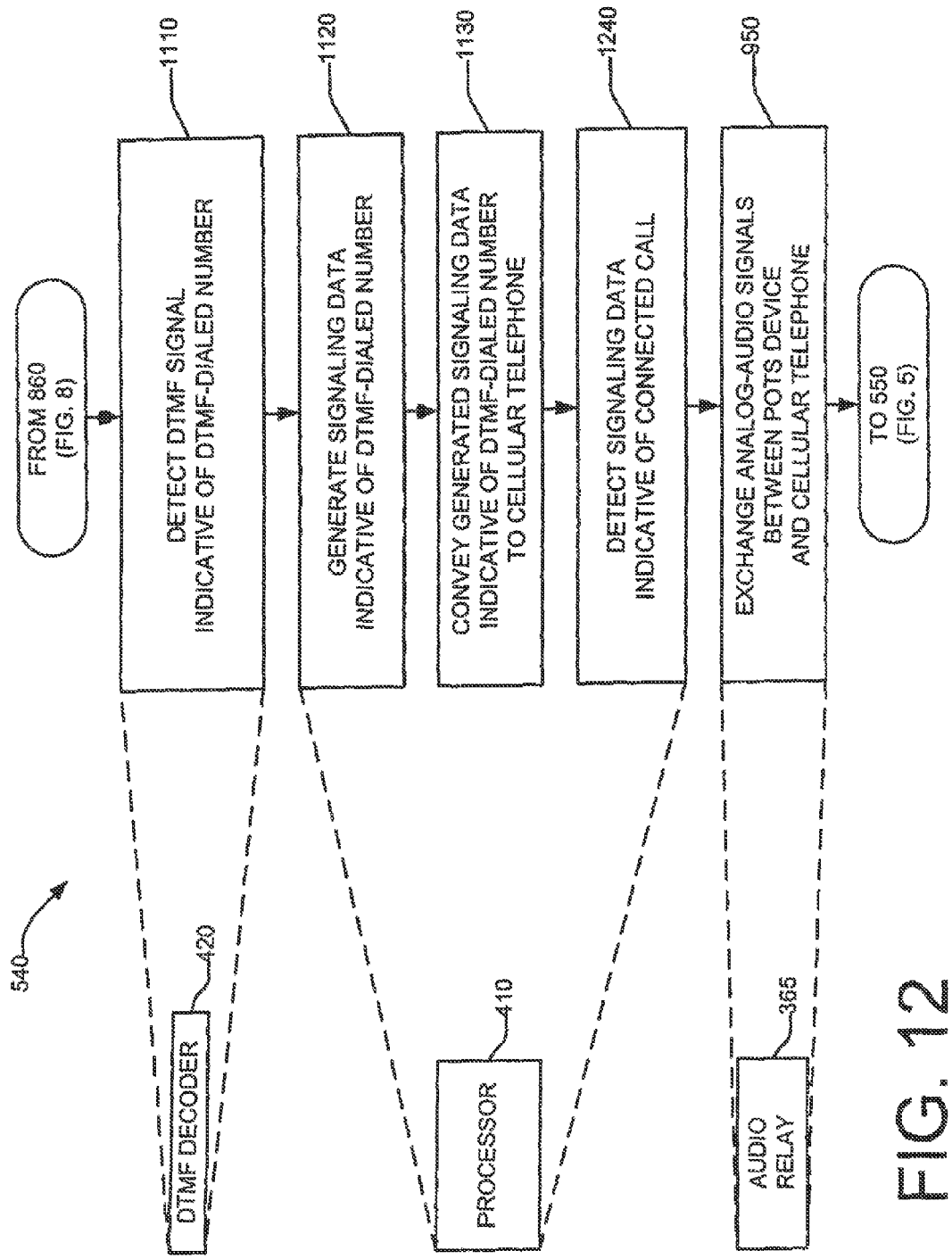

FIGS. 11 and 12 are flowcharts showing several illustrative embodiments of the method associated with "tone" dialing. As shown in FIG. 11, in one illustrative embodiment, the DTMF decoder 420 (FIG. 4) detects, in step 1110, a DTMF signal that is indicative of a DTMF-dialed number. In response to the DTMF signal, the processor 410 (FIG. 4) generates, in step 1120, signaling data on signaling line 355 (FIG. 3) that is indicative of the DTMF-dialed number. The signaling data on signaling line 355 (FIG. 3) is conveyed, in step 1130, to the cellular telephone 305 (FIG. 3), either with or without modification, by the processor 410 (FIG. 4) through the cellular phone docking station 310 (FIG. 3). This instructs the cellular telephone 305 (FIG. 3) to call the number that has been conveyed to the cellular telephone 305 (FIG. 3) by the signaling data on signaling line 355 (FIG. 3). When the called party "picks up" the phone, the system detects, in step 1140, an analog-audio signal 345 (FIG. 3) that is indicative of the connected call. At this point, the processor 410 (FIG. 4) enables the audio relay 365 (FIG. 3), and analog-audio signals 345 (FIG. 3) are exchanged, in step 950, between the POTS device 140, 150 (FIG. 2) and the cellular telephone 305 (FIG. 3). Thus, once the incoming call is connected between the cellular telephone 305 (FIG. 3) and the POTS device 140, 150 (FIG. 2), the POTS device 140, 150 (FIG. 2) freely communicates through the cellular network.

FIG. 12 is a flowchart showing another illustrative embodiment of the method associated with "tone" dialing. As shown in FIG. 12, the DTMF decoder 420 (FIG. 4) detects, in step 1110, a DTMF signal that is indicative of a DTMF-dialed number. In response to the DTMF signal, the processor 410 (FIG. 4) generates, in step 1120, signaling data on signaling line 355 (FIG. 3) that is indicative of the DTMF-dialed number. The signaling data on signaling line 355 (FIG. 3) is conveyed, in step 1130, to the cellular telephone 305 (FIG. 3), either with or without modification, by the processor 410 (FIG. 4) through the cellular phone docking station 310 (FIG. 3). This instructs the cellular telephone 305 (FIG. 3) to call the number that has been conveyed to the cellular telephone 305 (FIG. 3) by the signaling data on signaling line 355 (FIG. 3). When the called party "picks up" the phone, the cellular telephone 305 (FIG. 3) generates signaling data on signaling line 355 (FIG. 3) that is indicative of the connected call, and the processor detects, in step 1240, the signaling data on signaling line 355 (FIG. 3). At this point, the processor 410 (FIG. 4) enables the audio relay 365 (FIG. 3), and analog-audio signals 345 (FIG. 3) are exchanged, in step 950, between the POTS device 140, 150 (FIG. 2) and the cellular telephone 305 (FIG. 3). Thus, again, the POTS device 140, 150 (FIG. 2) freely communicates through the cellular network.

While several hardware components are shown with reference to FIGS. 3 and 4 to describe the interface controller 370, it will be clear to one of ordinary skill in the art that the interface controller 370 may be implemented in hardware, software, firmware, or a combination thereof. In one illustrative embodiment, the interface controller 370 (FIG. 3) is implemented in software or firmware that is stored in a memory and that is executed by a suitable instruction execution system. If implemented in hardware, as in FIGS. 3 and 4, the interface controller may be implemented with any or a combination of the following technologies: a discrete logic circuit having logic gates for implementing logic functions upon data signals, an Application Specific Integrated Circuit (ASIC) having appropriate combinational logic gates, a Programmable Gate Array (PGA), a Field Programmable Gate Array (FPGA), etc.

Figure 13:
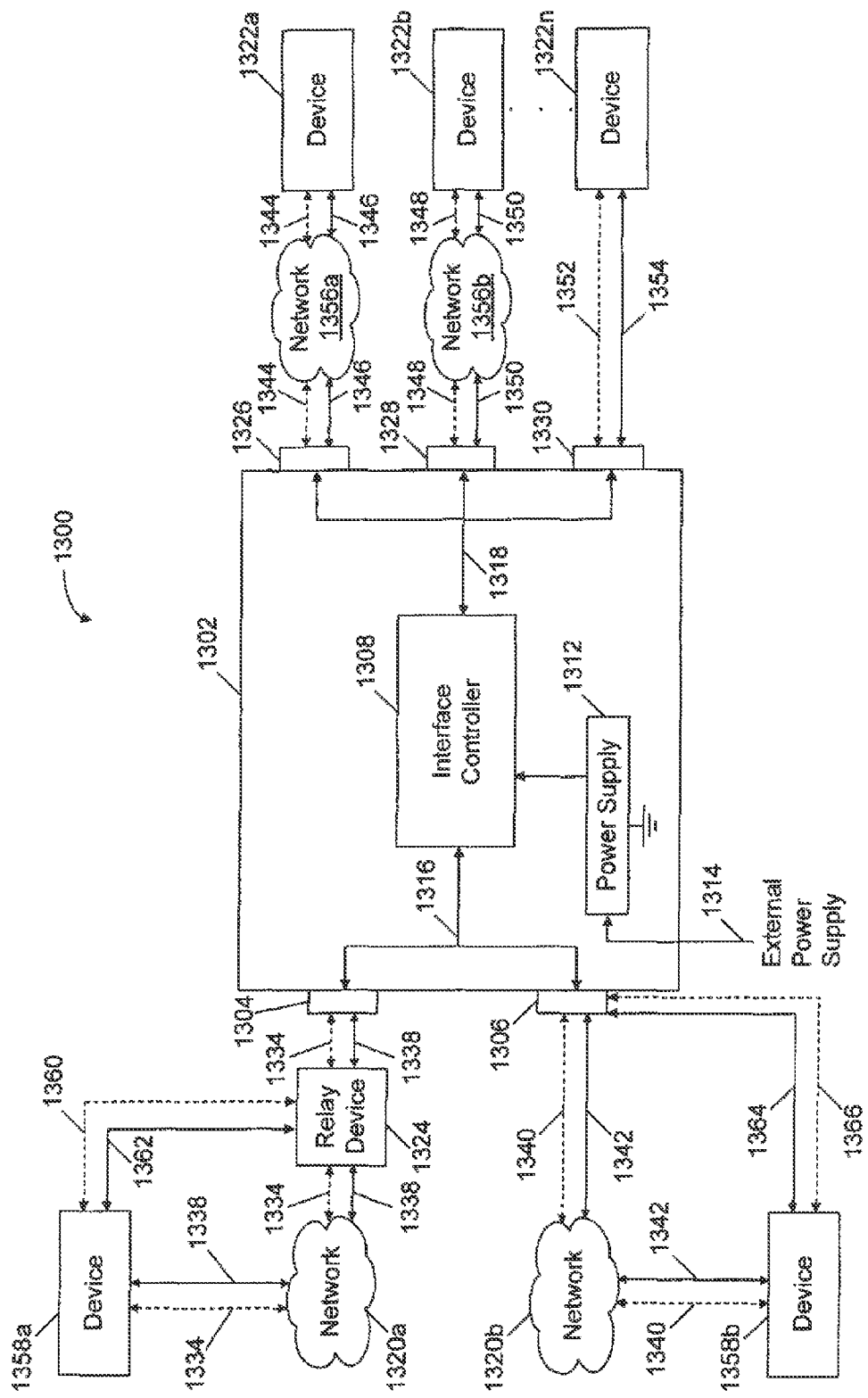
FIG. 13 is a block diagram showing an alternative illustrative embodiment of the interface device.

FIG. 13 is a block diagram showing a communications system 1300 including an interface device 1302 that is an alternative illustrative embodiment of the interface device 240 of FIG. 3. According to this embodiment, the interface device 1302 provides additional functionality, allowing any number of devices and networks to communicate with any number of additional devices and networks. In doing so, the interface device 1302 acts as a gateway for information, receiving and translating data between various formats for transmission over any type of transmission medium. As used herein, data comprises audio, video, voice, text, images, rich media, and any combination thereof.

Turning now to FIG. 13, the interface device 1302 provides communications between at least one of the devices 1358a, 1358b and at least one of the user devices 1322a-1322n. Communications provided between the devices 1358a, 1358b and the user devices 1322a-1322n via the interface device 1302 may include data comprising audio, video, voice, text, images, rich media, or any combination thereof. The devices 1358a, 1358b and the user devices 1322a-1322n may include communications devices capable of sending and receiving communications including, but are not limited to, cellular telephones, VoIP phones, WI-FI phones, POTS phones, computers, Personal Data Assistants (PDAs), Digital Video Recorders (DVRs), and televisions. According to one embodiment, the devices 1358a, 1358b may be associated with communications networks 1320a, 1320b such that communications provided by the devices are sent via the communications networks, and communications directed to the devices are delivered via the communications networks. Similarly, the user devices may be associated with communications networks such that communications provided by the user devices are sent via the communications networks, and communications directed to the user devices are delivered via the communications networks as illustrated by the user devices 1356*a*, 1356*b* and the communications networks 1356*a*, 1356*b* in FIG. 13. The communications networks 1320*a*, 1320*b* and 1356*a*, 1356*b* may include a wireless network such as, but not limited to, a Wireless Local Area Network (WLAN) such as a WI-FI network, a Wireless Wide Area Network (WWAN), a Wireless Personal Area Network (WPAN) such as BLUETOOTH, a Wireless Metropolitan Area Network (WMAN) such a Worldwide Interoperability for Microwave Access (WiMax) network, or a cellular network. Alternatively, the communications networks 1320*a*, 1320*b* and 1356*a*, 1356*b* may be a wired network such as, but not limited to, a wired Wide Area Network (WAN), a wired (Local Area Network) LAN such as the Ethernet, a wired Personal Area Network (PAN), or a wired Metropolitan Area Network (MAN).

The interface device 1302 may include at least one interface 1306 for communicating directly with the device 1358*b* and for communicating with the communications network 1320*b* associated with the device 1358*b*. It will be appreciated by those skilled in the art that the interface 1306 may comprise a wireline or wireless adapter for communicating with the device 1358*b* and with the communications network 1320*b*, which may include one of the wired or wireless networks described above. The interface 1306 may conform to a variety of wired network standards for enabling communications between the interface device 1302 and the device 1358*b* via a wired signaling connection 1364 and between the interface device and the communications network 1320*b* via a wired signaling connection 1342. The interface 1306 may include, but is not limited to, a coaxial cable interface conformed to MPEG standards, POTS standards, and Data Over Cable Service Specifications (DOCSIS). The interface 1306 may also conform to Ethernet LAN standards and may include an Ethernet interface, such as an RJ45 interface (not shown). The interface 1306 may further include a twisted pair interface conformed to POTS standards, Digital Subscriber Line (DSL) protocol, and Ethernet LAN standards. Moreover, the interface 1306 may include a fiber optics interface conformed to Synchronous Optical Network (SONET) standards and Resilient Packet Ring standards. It will be appreciated that the interface 1306 may also conform to other wired standards or protocols such as High Definition Multimedia Interface (HDMI).

The interface 1306 may further conform to a variety of wireless network standards for enabling communications between the interface device 1302 and the device 1358*b* via a wireless signaling connection 1366 and between the interface device and the communications network 1320*b* associated with the device via a wireless signaling connection 1340. The interface 1306 may include a cellular interface conformed to Advanced Mobile Phone System (AMPS) standards, Global System for Mobile Communications (GSM) standards, and Cellular Digital Packet Data (CDPD) standards for enabling communications between the interface device 1302 and the communications network 1320*b*. The interface 1306 may also include a WI-FI interface conformed to the 802.11x family of standards (such as 802.11a, 802.11b, and 802.11g). The interface 1306 may further include a WiMax interface conformed to the 802.16 standards. Moreover, the interface 1306 may include at least one of a satellite interface conformed to satellite standards or a receiver conformed to over-the-air broadcast standards such as, but not limited to, National Television System Committee (NTSC) standards, Phase Alternating Line (PAL) standards, and high definition standards. It will be appreciated that the interface 1306 may also conform to other wireless standards or protocols such as BLUETOOTH, ZIGBEE, and Ultra Wide Band (UWB). According to various embodiments, the interface device 1302 may include any number of interfaces 1306, each conformed to at least one of the variety of wired and wireless network standards described above for receiving data in a variety of formats from multiple devices and networks via multiple transmission media.

In one embodiment, the interface device 1302 may communicate with the device 1358*a* and with the communications network 1320*a* associated with the device 1358*a* via a relay device 1324. The relay device 1324 operates as a transceiver for the interface device 1302 to transmit and receive data to and from the device 1358*a* and the communications network 1320*a*. The relay device 1324 may modify the signaling data appropriately (e.g., amplify, attenuate, reformat, etc.), or, alternatively, the relay device 1324 may relay the signaling data without modification. Additionally, the relay device 1324 may be fixed, or may be portable to provide a user with a remote means for accessing data from a network or other device via the interface device 1302. Examples of fixed relay devices include, but are not limited to, a DSL modem, a cable modem, a set top device, and a fiber optic transceiver. Examples of portable relay devices include portable communications devices such as, but not limited to, a cellular telephone, a WI-FI telephone, a VoIP telephone, a PDA, a satellite transceiver, or a laptop.

The relay device 1324 may also include a combination of a fixed device and a portable device. For example, the relay device 1324 may comprise a cellular telephone in combination with a docking station. The docking station remains connected to the interface device 1302, through wired or wireless means, while the cellular telephone may be removed from the docking station and transported with a user. In this embodiment, data received from the interface device 1302 at the cellular telephone may be taken with the user to be utilized at a remote location. While the cellular telephone is not docked with the docking station, communication would occur between the device 1358*a* and the interface device 1302 as well as between the communications network 1320*a* and the interface device via a direct connection or via an alternate relay device.

The device 1358*a* may provide data via signals, which are transmitted either over a wireless signaling connection 1360 or over a wired signaling connection 1362 directly to the relay device 1324. Alternatively, the communications network 1320*a* associated with the device 1358*a* may provide data via signals, which are transmitted either over a wireless signaling connection 1334 or over a wired signaling connection 1338 to the relay device 1324. The data may include audio, video, voice, text, rich media, or any combination thereof. Signals provided by the device 1358*a* over the wireless signaling connection 1360 to the relay device 1324 and signals provided by the communications network 1320*a* over the wireless signaling connection 1334 to the relay device 1324 may be in a format compatible with a cellular network, a WI-FI network, a WiMax network, a BLUETOOTH network, or a satellite network. Signals provided by the device 1358*a* over the wired signaling connection 1362 to the relay device 1324 and signals provided by the communications network 1320*a* over the wired signaling connection 1338 may be in a format compatible with a DSL modem, a cable modem, a coaxial cable set top box, or a fiber optic transceiver.

Once the relay device 1324 receives data from the device 1358*a* or from the communications network 1320*a*, the relay device 1324 may transmit the data to an interface 1304 associated with the interface device 1302 via a signal over a wireless signaling connection 1334 or a wired signaling connection 1338. In one embodiment, the device 1358*a* and the communications network 1320*a* may communicate both directly with the interface device 1302 through the interface 1304 and with the interface device 1302 via the relay device 1324 through the interface 1304. The interface 1304 may conform to a variety of wireless network standards for enabling communications between the interface device 1302 and the relay device 1324. The interface 1304 may include a cellular interface conformed to AMPS, GSM standards, and CDPD standards for enabling communications between the interface device 1302 and the relay device 1324. The interface 1304 may also include a WI-FI interface conformed to the 802.11x family of standards (such as 802.11a, 802.11b, and 802.11g). The interface 1304 may further include a WiMax interface conformed to the 802.16 standards. Moreover, the interface 1304 may include at least one of a cordless phone interface or a proprietary wireless interface. It will be appreciated by one skilled in the art that the interface 1304 may also conform to other wireless standards or protocols such as BLUETOOTH, ZIGBEE, and UWB.

The interface 1304 may also conform to a variety of wired network standards for enabling communications between the interface device 1302 and the relay device 1324. The interface 1304 may include, but is not limited to, microphone and speaker jacks, a POTS interface, a USB interface, a FIREWIRE interface, a HDMI, an Enet interface, a coaxial cable interface, an AC power interface conformed to Consumer Electronic Bus (CEBus) standards and X.10 protocol, a telephone interface conformed to Home Phoneline Networking Alliance (HomePNA) standards, a fiber optics interface, and a proprietary wired interface.

Signals provided by the relay device 1324 over the wireless signaling connection 1334 to the interface 1304 may be in a format compatible with a cellular network, a WI-FI network, a WiMax network, a BLUETOOTH network, or a proprietary wireless network. Signals provided over the wired signaling connection 1338 to the interface 1304 may be in a format compatible with microphone and speaker jacks, a POTS interface, a USB interface, a FIREWIRE interface, an Enet interface, a coaxial cable interface, an AC power interface, a telephone interface, a fiber optics interface, or a proprietary wired interface.

Data received at the interfaces 1304, 1306 either directly from the devices 1358*a*, 1358*b* and the communications networks 1320*a*, 1320*b* or via the relay device 1324 is provided to an interface controller 1308 via a signaling line 1316. The interface controller 1308 is similar to the interface controller 370 of the interface device 240 described above with respect to FIG. 3. Once the interface controller 1308 receives data from the devices 1358*a*, 1358*b* or the communications networks 1320*a*, 1320*b*, the interface controller 1308 identifies one or more of the user devices 1322*a*-1322*n* and/or one or more of the communications networks 1356*a*, 1356*b* to receive the data, identifies a format compatible with the one or more receiving devices and/or receiving networks, and translates the current format of the data to the format compatible with the one or more receiving devices and/or receiving networks, which is further discussed below. After the data is translated, the interface controller 1308 provides the data to one or more of the interfaces 1326, 1328, and 1330 associated with the one or more devices and/or networks identified to receive the translated data via a signaling line 1318. For example, if the interface controller 1308 identifies a POTS telephone as the device to receive the translated data, then the interface controller provides the data via the signaling line 1318 to an interface compatible with POTS standards.

The interface controller 1308 is further configured to receive data from the user devices 1322*a*-1322*n* and the communications networks 1356*a*, 1356*b*, identify one or more of the devices 1358*a*, 1358*b* and/or one or more of the communications network 1320*a*, 1320*b* to receive the data, identify a format compatible with the one or more receiving devices and/or receiving networks, and translate the current format of the data to the format compatible with the one or more receiving devices and/or receiving networks. Thus, the interface controller 1308 provides a bi-directional communication for all data transmitted between the devices 1358*a*, 1358*b* and the user devices 1322*a*-1322*n*, between the devices 1358*a*, 1358*b* and the communications networks 1356*a*, 1356*b*, between the communications networks 1320*a*, 1320*b* and the user devices 1322*a*-1322*n*, and between the communication networks 1320*a*, 1320*b* and the communications network 1356*a*, 1356*b*. In an illustrative embodiment, the interface controller 1308 is also configured to either amplify or attenuate the signals carrying the data transmitted between the communications networks and the devices.

The interfaces 1326, 1328, and 1330 may transmit the data to the user devices 1322*a*-1322*n* directly, as illustrated by the interface 1330 in FIG. 13, or the interfaces 1326, 1328, and 1330 may transmit the data to the communications networks 1356*a*, 1356*b* associated with the devices 1322*a*, 1322*b*, as illustrated by the interfaces 1326, 1328 in FIG. 13. In either case, the interfaces 1326, 1328, and 1330 transmit the data via a signal over wireless signaling connections 1346, 1350, and 1354 or wired signaling connections 1344, 1348, and 1352, respectively. In another embodiment, one of the interfaces 1326, 1328, and 1330 may communicate the data to two or more of the devices 1322*a*-1322*n* and/or communications networks 1356*a*, 1356*b*.

The interfaces 1326, 1328, and 1330 may conform to a variety of wireless network standards for enabling communications between the interface device 1302 and the devices 1322*a*-1322*n* or the communications networks 1356*a*, 1356*b*. The interfaces 1326, 1328, and 1330 may include at least one cellular interface conformed to AMPS, GSM standards, and CDPD standards for enabling communications between the interface device 1302 and the devices 1322*a*, 1322*b*, and 1322*n*. The interfaces 1326, 1328, and 1330 may also include at least one WI-FI interface conformed to the 802.11x family of standards (such as 802.11a, 802.11b, and 802.11g). The interfaces 1326, 1328, and 1330 may further include at least one WiMax interface conformed to the 802.16 standards. Moreover, the interfaces 1326, 1328, and 1330 may include at least one of a cordless phone interface or a proprietary wireless interface. It will be appreciated by those skilled in the art that the interfaces 1326, 1328, and 1330 may also conform to other wireless standards or protocols such as BLUETOOTH, ZIGBEE, and UWB.

The interfaces 1326, 1328, and 1330 may also conform to a variety of wired network standards for enabling communications between the interface device 1302 and the devices 1322*a*-1322*n* or the communications networks 1356*a*, 1356*b*. The interfaces 1326, 1328, and 1330 may include, but are not limited to, microphone and speaker jacks, a POTS interface, a USB interface, a FIREWIRE interface, a HDMI, an Enet interface, a coaxial cable interface, an AC power interface conformed to CEBus standards and X.10 protocol, a telephone interface conformed to HomePNA standards, a fiber optics interface, and a proprietary wired interface.

Signals provided by the interfaces 1326, 1328, and 1330 over the wireless signaling connections 1346, 1350, and 1354 may be in a format compatible with a cellular network, a WI-FI network, a WiMax network, a BLUETOOTH network, or a proprietary wireless network. Signals provided over the wired signaling connections 1344, 1348, and 1352 may be in a format compatible with microphone and speaker jacks, a POTS interface, a USB interface, a FIREWIRE interface, a HDMI, an Enet interface, a coaxial cable interface, an AC power interface, a telephone interface, a fiber optics interface, or a proprietary wired interface.

For some interfaces such as, but not limited to, POTS interfaces, functionality of the interfaces that provide service from a network to a user device is different from the functionality of the interfaces that receive service from the network. Interfaces that deliver service from a network to a user device are commonly referred to as Foreign eXchange Subscriber (FXS) interfaces, and interfaces that receive service from the network are commonly referred to as Foreign eXchange Office (FXO) interfaces. In general, the FXS interfaces provide the user device dial tone, battery current, and ring voltage, and the FXO interfaces provide the network with on-hook/off-hook indications. In an embodiment, the interfaces 1326, 1328, and 1330 are the FXS interfaces that deliver data from the communications networks 1320*a*, 1320*b* to the user devices 1322*a*-1322*n*, and the interfaces 1304, 1306 are the FXO interfaces that receive data from the communications networks 1320*a*, 1320*b*.

As mentioned above, the interface controller 1308 may control the translation of the data received at the interface device 1302 from one format to another. In particular, the interface controller 1308 is configured to control the behavior of the relay device 1324 and any additional components necessary for translating data in order to effectuate the translation of the data from one format to another format. For example, as described above, for translating between POTS compatible signals and cellular network compatible signals, the interface controller 1302 may communicate with an audio relay and a tone generator, and includes an off-hook/pulse sensor and a DTMF decoder. The interface device 1302 shares the same capabilities for translating between POTS compatible signals and cellular network compatible signals as described above with regard to the interface device 240 illustrated in FIG. 3, but the interface device 1302 also has additional translation capabilities for translating between any number and type of other signals. Consequently, the interface device 1302 may comprise any components necessary for a given translation.

According to one embodiment, the interface controller 1308 comprises a processor, RAM, and non-volatile memory including, but not limited to ROM and SRAM. The ROM is configured to store logic used by the interface controller 1308 to translate data received at the interface device 1302. In this sense, the ROM is configured to store the program that controls the behavior of the interface controller 1308, thereby allowing the interface controller 1308 to translate data signals from one format to another. The SRAM is adapted to store configuration information and may be adapted differently depending on geographical area and signal formats and protocols. The configuration information stored on the SRAM of the interface controller 1308 may include default configuration information originally provided on the interface device 1302. In another embodiment, the configuration information may include a user profile associated with one or more of the devices 1322*a* -1322*n*, one or more of the communications networks 1356*a*, 1356*b*, or a combination thereof. The user profile may include user preferences established by one or more users of the interface device 1302 regarding formats in which data is to be transmitted and received, translations to be performed on the data, the devices and networks to send and receive the data, as well as any other configuration information associated with transmitting data via the interface device 1302. The RAM is configured to store temporary data during the running of the program by the processor, allowing the RAM to operate as a memory buffer for times in which the data is being received at a rate that is faster than the interface device 1302 can determine a proper recipient, translate the data, and transmit the data to the proper recipient. The processor is configured to generate signaling data on the signaling line 1316, which may instruct the relay device 1324 to dial a number, connect to a network, etc.

As mentioned above, the interface device 1302 contains logic within the interface controller 1308 that is used by the interface controller to translate data received at the interface device. The logic may include any number and types of data translation standards. In particular, the interface controller 1308 uses the logic to translate the data received at one of the interfaces 1304, 1306, 1326, 1328, 1330 of the interface device 1302 from at least one format to at least one other format. How the data received at the interface device 1302 is translated may be based on any one or combination of factors. According to one embodiment, the type of data translation may depend on the source and destination of the data. It should be understood that although the description contained herein describes the devices 1358*a*, 1358*b* and the communications networks 1320*a*, 1320*b* as the source devices and the source networks, respectively, and the user devices 1322*a*-1322*n* and the communications networks 1356*a*, 1356*b* as the destination devices and the destination networks, respectively, embodiments contemplate data transfer from the user devices 1322*a* -1322*n* and from the communications networks 1356*a*, 1356*b* to the devices 1358*a*, 1358*b* and to the communications networks 1320*a*, 1320*b* as well as bidirectional communication and data transfer. As an example, data arriving at the interface device 1302 that is directed to a POTS device would be translated to a format compatible for transmission over the appropriate medium associated with the POTS device.

According to another embodiment, the type of data translation may depend on default configuration information originally provided on the interface device 1302. For example, the default configuration information may be provided by a service provider offering the interface device 1302 to customers. In yet another embodiment, the type of data translations may depend on a user profile stored on the interface device 1302. As discussed above, the user profile may be configured by a user of the interface device 1302 to include user preferences regarding formats in which data is to be transmitted and received, translations to be performed on the data, the devices and networks to send and receive the data, as well as any other configuration information associated with transmitting data via the interface device 1302.

When configuring the user profile, the user may specify the appropriate destination device, transmission medium, and filtering options for data received under any variety of circumstances. For example, the user may configure the interface device 1302 such that all incoming rich media content is translated for transmission to and display on the device 1322*b*, which, as discussed above, may include a television. The user might configure the interface device 1302 such that only media from specific websites be allowed to download to a device or network via the interface device 1302. In doing so, the user profile might include access data such as a user name and password that will be required from the user prior to accessing a specific type or quantity of data. The user profile may additionally contain priorities for translation and transmission when multiple data signals and data formats are received at the interface device 1302. For example, a user may specify that audio data be given transmission priority over other types of data. The priority may be based on a specific transmitting or receiving device, the type of transmitting or receiving device, the format of the data being transmitted or received, the transmission medium of the transmitting or receiving signals, or any other variable. As used herein, the format associated with the data may include a transmission medium associated with the signal carrying the data, a standard associated with the data, or the content of the data.

It should be understood by one skilled in the art that data translations as discussed above may include several different types of data conversion. First, translating data may include converting data from a format associated with one transmission medium to another transmission medium. For example, audio data from an incoming telephone call may be translated from a wireless, cellular signal to a twisted pair wiring signal associated with POTS telephones. Next, data translation may include converting data from one type to another, such as when voice data from a telephone or network is translated into text data for display on a television or other display device. For example, data translation may include, but is not limited to MPEG 2 translation to MPEG 4, or the reverse, Synchronized Multimedia Interface Language (SMIL) to MPEG 1, or Macromedia Flash to MPEG 4.

Additionally, data translation may include content conversion or filtering such that the substance of the data is altered. For example, rich media transmitted from one or more of the devices 1358*a*, 1358*b* or one or more of the communications networks 1320*a*, 1320*b* may be filtered so as to extract only audio data for transmittal to one or more of the user devices 1322*a*-1322*n* or one or more of the communications networks 1356*a*, 1356*b*. Translation may further include enhancing the data, applying equalizer settings to the data, improving a poor quality signal carrying data based on, e.g., known characteristics of the device providing the data signal, degrading the data signal, or adding a digital watermark to the data to identify the device or the network associated with the data or the user sending the data. Translation may further include adding information to the data and annotating the data. Moreover, translation may include any combination of the above types of data conversions.

In one embodiment, data received at the interface controller 1308 may include a request for data. It should be understood that the request may be dialed telephone numbers, an IP address associated with a network or device, or any other communication initiating means. When a request for data is provided by one of the user devices 1322*a*-1322*n*, the devices 1358*a*, 1358*b*, the communications networks 1320*a*, 1320*b*, or the communications networks 1356*a*, 1356*b*, the interface controller 1308 receives the request and converts the request to a digital command. The digital command is transmitted as signaling data either on the signaling line 1316 to one or more of the interfaces 1304, 1306 or on the signaling line 1318 to one or more of the interfaces 1326, 1328, and 1330 based on the devices and/or communications networks identified to receive the request. Once received at one or more of the interfaces 1304, 1306 or one or more of the interfaces 1326, 1328, and 1330, the signaling data is transmitted to the destination devices and/or communications networks either directly or via the relay device 1324. If the signaling data is transmitted to the relay device 1324, the signaling data instructs the relay device to make the required connection to the identified devices 1358*a*, 1358*b* and/or the identified communications networks 1320*a*, 1320*b*.

When a connection is made between the device 1358*a* and one or more of the user devices 1322*a*-1322*n*, between the device 1358*a* and one or more of the communications networks 1356*a*, 1356*b*, between the communications network 1320*a* and one or more of the user devices 1322*a*-1322*n*, or between the communications network 1320*a* and one or more of the communications network 1356*a*, 1356*b* in response to a request for data, the relay device 1324 detects the connection and conveys a signal to the interface controller 1308. In this illustrative embodiment, in response to receiving the signal from the relay device 1324, the interface controller 1308 enables bi-directional communication of the requested data. If one of the devices and/or communications networks that requested the data disconnects, then the disconnect is detected by the interface controller 1308. In this illustrative embodiment, the interface controller 1308 terminates the bi-directional communication by generating another signal, which instructs the relay device 1324 to stop transmission and reception of the data. If, on the other hand, the relay device 1324 disconnects, then this is detected by the interface controller 1308, which, in response, terminates the bi-directional communication by stopping transmission and reception of the data.

While hardware components are shown with reference to FIG. 13 to describe the interface controller 370, it will be clear to one of ordinary skill in the art that the interface controller 370 may be implemented in hardware, software, firmware, or a combination thereof. In one illustrative embodiment, the interface controller 1308 is implemented in software or firmware that is stored in a memory and that is executed by a suitable instruction execution system. If implemented in hardware, as in FIG. 13, the interface controller 1308 may be implemented with any or a combination of the following technologies including, but not limited to, a discrete logic circuit having logic gates for implementing logic functions upon data signals, an ASIC having appropriate combinational logic gates, a PGA, a FPGA, other adaptive chip architectures, etc.

The power supply 1312 is configured to provide the components of the interface device 1302 with the requisite power similar to the power supply 335 discussed above in view of FIG. 3. In this sense, the power supply 1312 is connected to an external power supply 1314 from which it receives external power. The external power is converted by the power supply 1312 to a DC voltage, which is used to power the components of interface device 1302 and optionally, the relay device 1324.

Figure 14:
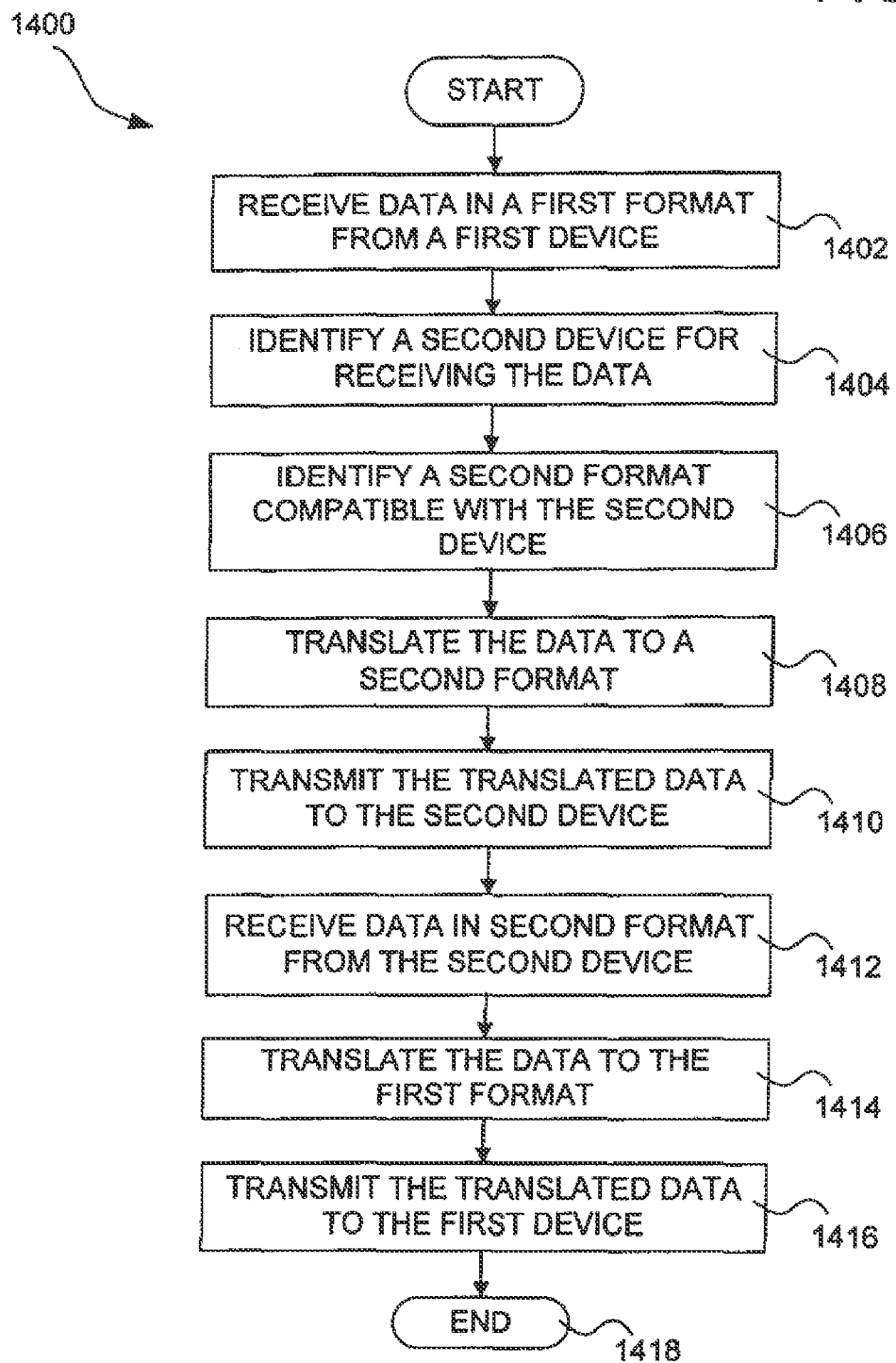
FIG. 14 is a flowchart showing an illustrative embodiment of the method and computer-readable medium associated with providing bi-directional communications between a first device and a second device.

Referring now to FIG. 14, additional details regarding the operation of the interface device 1302 for providing communications between a first device and a second device will be discussed. It should be appreciated that the logical operations of the various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing exemplary embodiments. Accordingly, the logical operations of FIG. 14 and other flow diagrams and making up the embodiments described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the exemplary embodiments as recited within the claims attached hereto.

The routine 1400 begins at operation 1402, where data is received in a first format from a first device 1321. The data is received at an interface 1304 of interface device 1302. The interface device 1302 identifies a second device 1322 for receiving the data at operation 1404. This identification may depend upon a user profile stored within the interface device 1302. Alternatively, identifying a second device may comprise selecting a second device that is compatible with the signal type or transmission medium corresponding to the data received at interface 1304. After identifying the second device 1322, the interface device 1302 identifies a second format compatible with the second device 1322 at operation 1406. Similarly, this process may be based on a user profile or on the characteristics of the second device 1322. For example, the second device may be selected based on a user profile that instructs a POTS telephone to receive all media received at interface 1304. Because the POTS telephone does not have the capability to display video, the interface device 1302 may identify the second format as containing only the audio portion of the received media.

At operation 1408, the data is translated to the second format for transmittal to the second device 1322. The data is then transmitted to the second device 1322 at operation 1410. The communications capabilities of interface device 1302 are bi-directional. At operation 1412, data is received in a second format from the second device 1322. This data is translated to the first format at operation 1414. After transmitting the translated data to the first device 1321 at operation 1416, the routine 1400 continues to operation 1418, where it ends.

Figure 15:
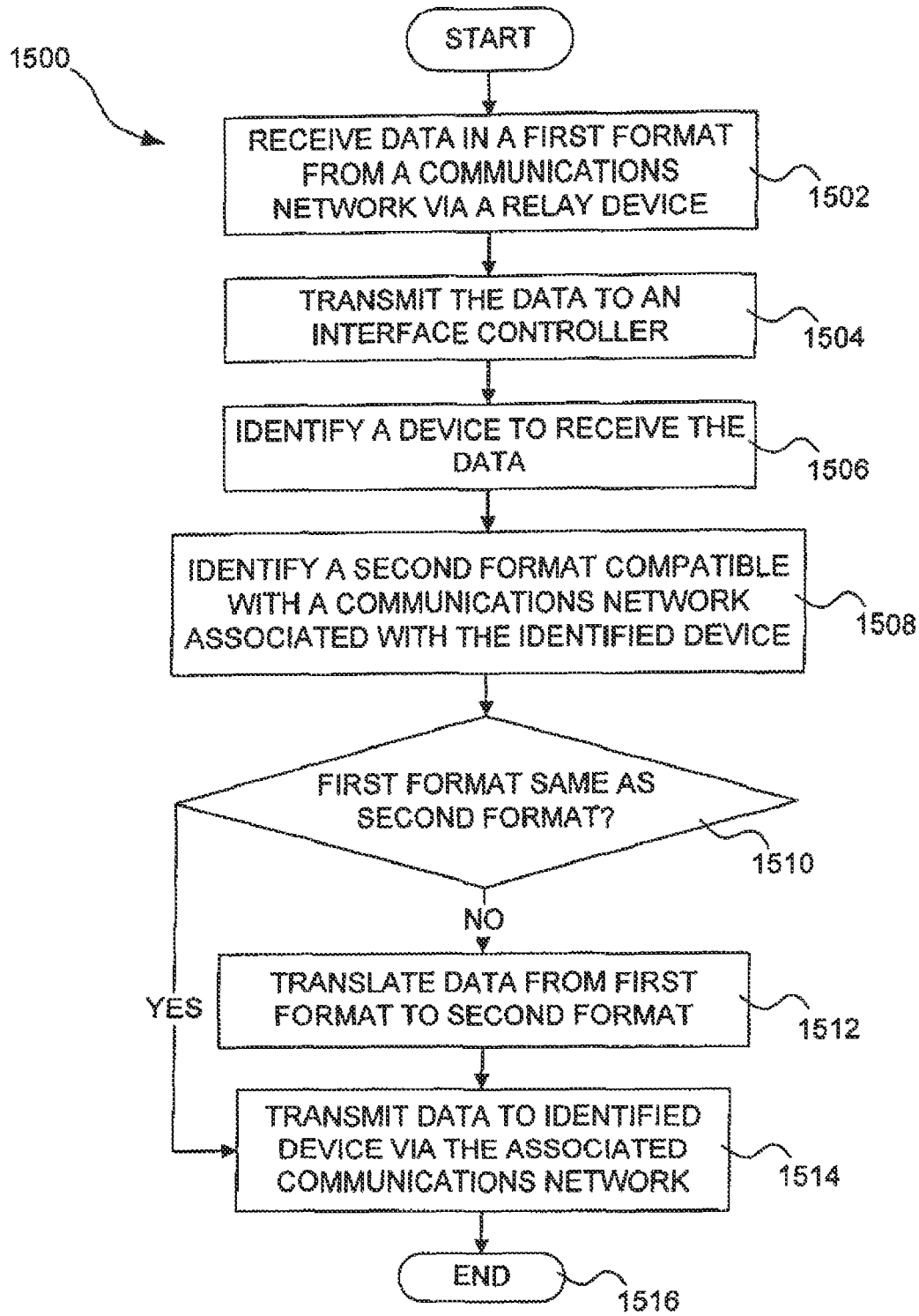
FIG. 15 is a flowchart showing an illustrative embodiment of the method and computer-readable medium associated with interfacing devices with communications networks.

Turning now to FIG. 15, an illustrative routine 1500 will be described illustrating a process for interfacing devices with communications networks. The routine 1500 begins at operation 1502, where the interface 1304 associated with the interface device 1302 receives data in a first format from the communications network 1320a via the relay device 1324. As discussed above, the interface 1304 may conform to a variety of wireless or wired network standards such that the interface may receive a variety of types of data via a variety of types of signals.

Once the data is received at the interface 1304, the routine 1500 continues to operation 1504, where the data is transmitted via the signaling line 1316 to the interface controller 1308. At operation 1506, the interface controller 1308 identifies at least one of the devices 1322a-1322n to receive the data from the communications network 1320a. As discussed above in view of FIG. 13, the interface controller 1308 may identify which of the devices 1322a-1322n should receive the data based on compatibility with the communications networks associated with each of the devices, a user profile stored on the interface device 1302, or instructions from the communications network 1320a that provided the data as to which of the devices should receive the data.

After the interface controller 1308 identifies at least one of the devices 1322a-1322n to receive the data, the routine 1500 proceeds to operation 1508, where the interface controller 1308 identifies a second format compatible with the communications network associated with the at least one device identified from the devices 1322a-1322n to receive the data. The routine 1500 then proceeds to operation 1510, where the interface controller 1308 determines whether the first format of the data is the same as the second format compatible with the communications network associated with the at least one device identified from the devices 1322a-1322n to receive the data. If the formats are the same, then the routine 1500 proceeds to operation 1514. If the formats are not the same, then the routine 1500 proceeds to operation 1512, where the interface controller 1308 translates the data from the first format to the second format compatible with the communications network associated with the at least one device identified from the devices 1322a-1322n to receive the data. The routine 1500 then proceeds to operation 1514.

At operation 1514, the interface controller 1308 transmits the data, whether translated or not, through at least one of the interfaces 1326, 1328, and 1330 associated with the at least one device identified from the devices 1322a-1322n to the device identified from the devices 1322a-1322n to receive the data via either a wireless or wired signaling connection. As discussed above with regard to FIG. 13, the interfaces 1326, 1328, and 1330 may be conformed to a variety of wired and wireless network standards so that the interfaces can transmit a variety of types of data via a variety of types of signals. From operation 1514, the routine 1500 continues to operation 1516, where it ends.

Figure 16:
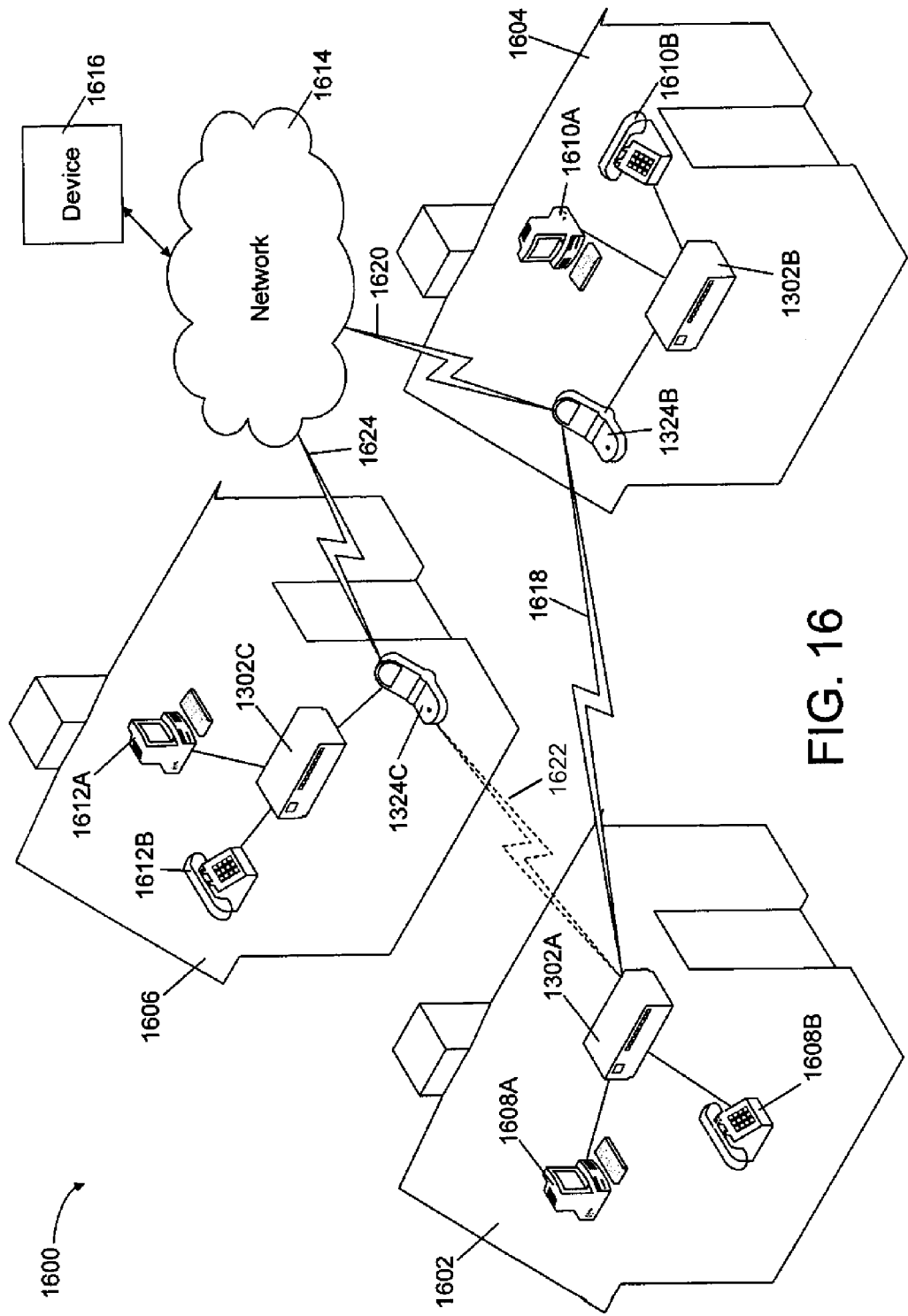
FIG. 16 is a block diagram showing an illustrative embodiment of a peer-to-peer network of interface devices in a home-networking environment.

FIG. 16 shows an interface device peer-to-peer network 1600 in which multiple interface devices 1302A-1302C may interact to provide a user with greater functionality and network access reliability. Peer-to-peer network 1600 includes home networks 1602, 1604, and 1606, network 1614, and at least one device 1616 associated with the network 1614. It should be understood that while FIG. 16 shows three home networks for illustration purposes, any number of home networks may communicate with one another via interface devices 1302. Each home network has two communications devices connected to an interface device 1302 that communicates outside of the home network via a direct connection or a relay device 1324. For example, home network 1602 includes communications devices 1608A and 1608B, a personal computer and POTS telephone respectively, communicatively linked to an interface device 1302A. The interface device 1302A communicates outside of the home network 1602 via a direct connection to a relay device 1324B that is linked to interface device 1302B.

Home network 1604 includes communications devices 1610A and 1610B, interface device 1302B, and relay device 1324B. Similarly, home network 1606 includes communications devices 1612A and 1612B, interface device 1302C, and relay device 1324C. It should be understood that each home network shown in FIG. 16 may include any number and type of connected communications devices. For clarity, each home network of FIG. 16 shows only a computer and POTS telephone connected to each interface device 1302A, 1302B, and 1302C. Additionally, each interface device 1302 shown in FIG. 16 may include the components and have the capabilities of the interface device 1302 described above with respect to FIGS. 1-15. As discussed above with reference to interface device 1302, each interface device 1302A, 1302B, and 1302C may have any number of interfaces for communicatively linking the interface device with an external device or network. Therefore, each interface device 1302A, 1302B, and 1302C may communicate with the connected communications devices, as well as the external network 1614 or any other network, via wired or wireless means, with or without a relay device 1324. It should be appreciated that a direct connection, in the context of this description, may be a wired or wireless connection for communicating with a device or network without utilizing a relay device. Accordingly, interface device 1302A is shown to communicate with external networks using a direct connection, while interface devices 1302B and 1302C are shown to communicate with external networks via the relay devices 1324B and 1324C, respectively.

Referring to FIG. 16, home networks 1602, 1604, and 1606 form a peer-to-peer network, with the interface devices 1302A-1302C communicating and sharing information between one another and associated communications devices. One benefit of a peer-to-peer network of interface devices will be described according to an embodiment in which the interface device 1302A and the interface device 1302B share data via the communications link 1618. The interface device 1302A is not configured for a direct connection to the network 1614. Rather, the user associated with home network 1602 receives data from the device 1616 or the network 1614 primarily via the interface device 1302B and alternatively via the interface device 1302C. In practice, this scenario is likely to occur when a user associated with home network 1602 purchases an interface device 1302A that has minimal network capabilities and enters an agreement with neighbors associated with home networks 1604 and 1606 to access network 1614 through one of their interface devices, namely interface device 1302B or 1302C. This agreement may be in the form of a subscription. Subscriptions will be described in detail below with respect to FIG. 18.

The interface device 1302B relays the data requested by the interface device 1302A from the network 1614 via communications link 1620 to the interface device 1302A via communications link 1618. Interface device 1302A communicates with interface device 1302B by any of the means set out above for communicating with any other communications device. In our example, the interface device 1302A may have a network interface card or wireless transceiver for communicating with the interface device 1302B or the relay device 1324B associated with the interface device 1302B via a direct connection. The communication link 1618 that is established between the interface device 1302A and the interface device 1302B may be wired or wireless.

As previously discussed, an interface device 1302 translates data between formats compatible with the source communications device and destination communications device. In an interface device peer-to-peer network, data translation may occur at multiple locations. First, continuing our example shown in FIG. 16, wherein data is transmitted from network 1614 to the interface device 1302A via the interface device 1302B, the data may be translated at the interface device 1302B. The data may be translated again at the interface device 1302A prior to sending the data to the appropriate device, 1608A or 1608B. It should be understood that when requesting the data, the interface device 1302A may specify a format for the data to be transmitted in from the interface device 1302B. This may be the format required for the destination device, 1608A or 1608B, or may require additional translation by the interface device 1302A. Alternatively, the interface device 1302B may simply pass the data from the source to the interface device 1302A without any translation at all. Finally, if the data is transmitted from the network 1614 in a format compatible with the destination device, 1608A or 1608B, then no translation is required by either interface device 1302A or 1302B. It should also be understood that translation may include inserting or filtering portions of data to or from the requested data. This process will be discussed below with respect to FIG. 18 and the discussion of subscriptions.

Should the communications link 1618 between the interface device 1302A and the interface device 1302B be lost, or should the communication link 1620 between the interface device 1302B and the network 1614 be lost, the interface device 1302A would no longer be able to access data from device 1616 through the interface device 1302B. However, each interface device 1302A-1302C has the capability to detect the presence of another interface device 1302 for the purpose of establishing communications. In FIG. 16, the interface device 1302C associated with the home network 1606 has a communication link 1624 established with network 1614. When the interface device 1302A loses the connection with the network 1614 via the interface device 1302B, the interface device 1302A may detect the presence of the interface device 1302C and establish a connection to the interface device 1302C. The interface device 1302A may then request data from network 1614 or device 1616 from the interface device 1302C, via communication links 1622 and 1624.

This process of switching from the interface device 1302B to the interface device 1302C may occur seamlessly as the interface device 1302A detects problems with the initial communications link such that the interface device 1302B hands off the communications link to the interface device 1302C much in the same way that a cellular tower may hand off a telephone call to another cellular tower when the cellular signal degrades. In this manner, the data stream between the network 1614 to the interface device 1302A may continue uninterrupted as the communications link is handed off to the interface device 1302C. Alternatively, the data stream may be interrupted briefly while the interface device 1302A detects and connects to the interface device 1302C at which point data may continue to be transferred between the network 1614 and the interface device 1302A.

Detection of available interface devices occurs through any number of methods. As an example, the interface device 1302A may monitor the interfaces of the interface devices 1302B and 1302C for a signal indicating the presence of a connected device. When a device is detected, the interface device 1302A may compare identification information associated with the device to stored identification information associated with known interface devices. An alternate interface device, e.g., interface device 1302C, is then selected from the available interface devices, and a new connection is established. The alternate interface device 1302C may be selected according to the device with the strongest signal, such as in the case of a wireless connection. Alternatively, an interface device, e.g., interface device 1302C, may be selected according to a priority or preference list established by a user and stored within the user profile.

Another method of detecting available interface devices is to actively contact alternate interface devices and request to open a communications link. For example, a list of alternate interface devices, contact information (i.e. phone number, IP address), and assigned priorities may be stored with the user profile within non-volatile memory. Upon losing a communications link with a device 1702, the interface device 1302A references the user profile or other stored data containing alternate interface device contact information and retrieves the contact information for the interface device that is assigned the highest priority. The interface device 1302A attempts to contact the alternate interface device and to establish a communications link. For example, upon losing communications link 1618, interface device 1302A determines that interface device 1302C has the highest priority on an alternate interface device list stored with the user profile. The interface device 1302A transmits a request for communication over a cellular network in accord with the contact information stored with the alternate interface device information. The communications link 1622 is established, wherein the interface device 1302A may receive data from the network 1614 via the interface device 1302C.

Figure 17:
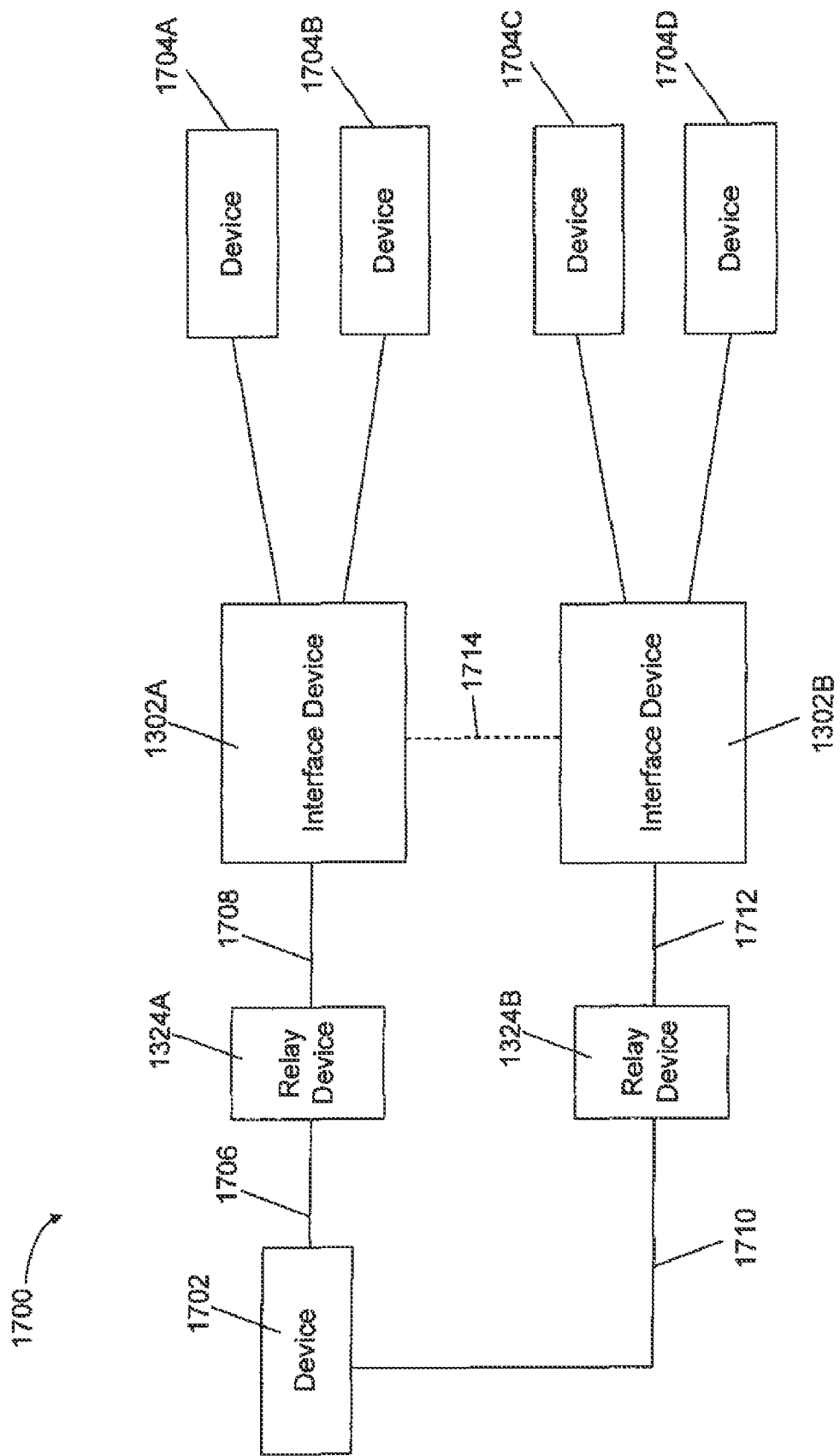
FIG. 17 is a block diagram showing an illustrative embodiment of a peer-to-peer network between interface devices.

Turning now to FIG. 17, an embodiment will be described in which a peer-to-peer network 1700 is established between interface devices 1302A and 1302B upon the failure of a communications link between the interface device 1302A and a communications device 1702. The interface device 1302A provides communications between communications devices 1702, 1704A, and 1704B via the relay device 1324A. Similarly, the interface device 1302B provides communications between communications devices 1702, 1704C, and 1704D via the relay device 1324B. It should be understood that although FIG. 17 shows the interface devices 1302A and 1302B communicating with device 1702 through the relay devices 1324A and 1324B, the interface devices 1302A and 1302B may communicate with the communications device 1702 through a direct wired or wireless connection as described above. Should communications link 1706 or 1708 fail, the interface device 1302A would be unable to communicate with device 1702. If, however, a peer-to-peer network is established between the interface devices 1302A and 1302B, communications between device 1702 and the interface device 1302A may be reestablished via communications links 1710 and 1712. In this manner, the interface device 1302B provides back-up network and device connection capability to interface device 1302A. Upon the failure of communications link 1706 or 1708, the interface device 1302A detects an alternate interface device 1302B in the manner described above with respect to FIG. 16. A communications link 1714 is established and the interface device 1302A may continue to receive data from communications device 1702 via interface device 1302B.

As described herein, an interface device has the capability to facilitate communications between a wide variety of communication devices and networks due to the ability of the interface device to translate between any number of data formats. According to various embodiments, interface devices may be restricted to a limited number or type of data translation. This may be accomplished through the manufacturing process, limiting the number and type of interfaces on the interface device, or may be accomplished using software programs that lock out certain translation capabilities until unlocked by an authorized person. Because of this capability, interface devices may be sold or leased at a cost associated with the capabilities of the particular interface device. Interface devices with minimal or reduced capabilities may then subscribe to interface devices with desired capabilities.

Figure 18:
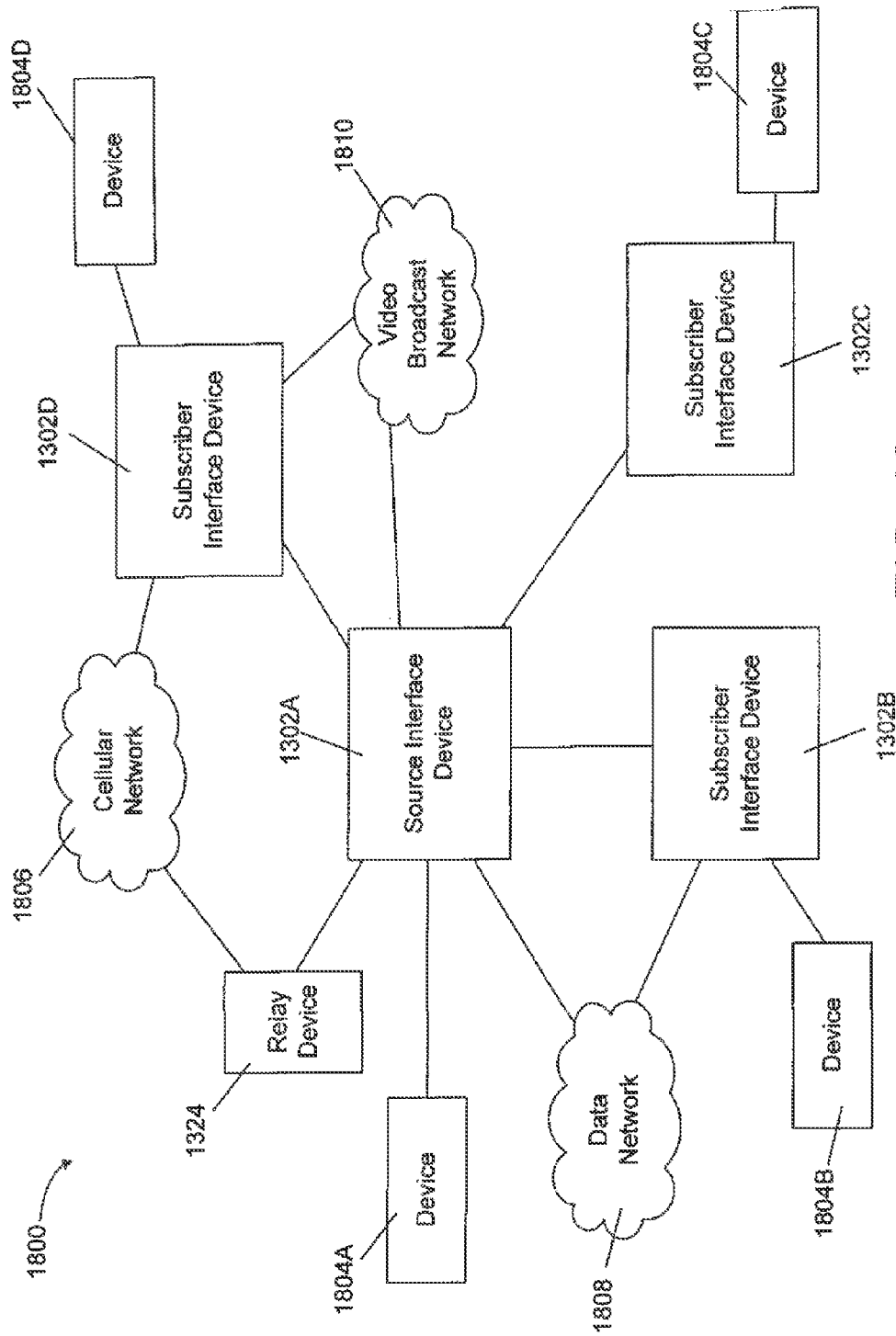
FIG. 18 is a block diagram showing an illustrative embodiment of a network of subscriber interface devices with a source interface device.

Referring to FIG. 18, a subscriber network 1800 of interface devices will be described. The interface device 1302A is described with respect to FIG. 18 as the source interface device 1302A since it acts as a data source to various subscriber interface devices 1302B-1302D. Each subscriber interface device 1302B-1302D is an interface device that receives data via the source interface device 1302A. According to the subscriber network 1800 shown in FIG. 18, the source interface device 1302A has three subscriber interface devices, 1302B-1302D, but it should be understood that any number of interface devices may subscribe to a source interface device. The source interface device 1302A has access to a cellular network 1806, a data network 1808, and a video broadcast network 1810, as well as a communications device 1804A. In this example, the cellular network 1806 is a wireless network over which voice data is transmitted using cellular telephone standards. The data network 1808 is a network over which text data is primarily transmitted. Examples of text data include facsimiles, electronic mail, and text messaging. This network may be a wired or wireless network. The video broadcast network 1810 is a network over which rich media is transmitted. Examples of rich media include television broadcasts and video data. This network may also be wired or wireless.

According to the example embodiment shown in FIG. 18, the source interface device 1302A communicates with the cellular network 1806 via a relay device 1324, which in this example is a cellular telephone. The source interface device 1302A communicates directly with the data network 1808, the video broadcast network 1810, and the communications device 1804A without the use of a relay device. It should be understood that the relay device 1324 may be any communications device and that the source interface device 1302A may utilize a relay device for communicating with any of the connected networks or devices. The communications device 1804B has access to the data network 1808 via the subscriber interface device 1302B, but does not have access to the cellular network 1806, the video broadcast network 1810, or the communications device 1804A. To gain access to these other networks and devices, a subscription to the source interface device 1302A is obtained.

The subscription may be associated with the interface device 1302B such that any communications device 1804B that is connected to the interface device 1302B may gain access to the resources of the source interface device 1302A. Alternatively, the subscription may be associated with a specific device, such as communications device 1804B, wherein the communications device is permitted to connect to and utilize the resources of the source interface device 1302A via any interface device 1302B-1302D. Moreover, the subscription may be associated with a user such that the user is authorized to connect to and utilize the resources of the source interface device 1302A via any interface device 1302B-1302D and any communications device 1804B-1804D.

To continue the example illustrated in FIG. 18, the communications device 1804C is communicatively linked to the interface device 1302C, which does not have access to any networks or additional devices. In order to gain access to data associated with the cellular network 1806, the video broadcast network 1810, or the communications device 1804A, a subscription to the source interface device 1302A is obtained. The communications device 1804D has access to data associated with the video broadcast network 1810, and the cellular network 1806 via the interface device 1302D, but does not have access to data associated with the data network 1808 or data associated with the communications device 1804A. To gain access to these other networks and devices, a subscription to the source interface device 1302A is obtained.

According to an exemplary embodiment, a subscription may be fee-based, with the costs of the subscription corresponding to the functionality that the subscription provides to the subscriber. In addition to providing access to data associated with networks and devices not otherwise accessible to a subscriber interface device, a subscription may also provide other advanced features. The source interface device 1302A may operate to insert, filter, and translate data prior to transmitting the requested data to any of the subscriber interface devices 1302B-1302D. For example, the source interface device 1302A may insert messages pertaining to subscription status, data availability, data access history, or future data access options to the data that is transmitted to any requesting subscriber interface device 1302B-1302D. The source interface device 1302A may also include advertisements with data delivered to the subscriber interface devices 1302B-1302D.

Similarly, the source interface device 1302A may filter portions of data from the data requested by the subscriber interface devices 1302B-1302D. Filtering might occur based on the subscription. If the data requested exceeds the boundaries of the subscription, a portion of the data requested will be filtered out according to the user profile or other programming. Moreover, as discussed above with respect to FIG. 16, data translations may occur at the source interface device 1302A, at the subscriber interface devices 1302B-1302D, at all interface devices 1302A-1302D, or no translations may occur at all. A subscription may define the format of the data to be sent to a subscriber interface device 1302B-1302D from the source interface device 1302A. Further translations may occur at each subscriber interface device depending on the communications device 1804B-1804D that is identified for receiving the data. Alternatively, the source interface device 1302A may relay all requested data to each subscriber interface device 1302B-1302D without translating the data at all, allowing for any necessary translation to occur at the subscriber interface device. Finally, all interface devices may pass the data to the destination communications device 1804 without any translation at all.

The source interface device 1302A may have any number of advanced features that may be subscribed to by other interface devices. As an example, the source interface device 1302A may provide numerous data security features, preventing unauthorized access of data to or from any of the networks or devices to which it is communicatively linked. The source interface device 1302A may provide advanced call features to legacy telephony devices connected to subscriber interface devices 1302B-1302D. For example, caller ID functionality may be provided to POTS telephones without a display by means of assigned ring tones or other audible tones. All advanced features that an interface device may provide to a communications device may be located within the source interface device 1302A and subscribed to by the subscriber interface devices 1302B-1302D.

Turning now to FIG. 19, additional details regarding the operation of the source interface device 1302A for providing data from a device or network to a subscriber interface device 1302B-1302D will be discussed. The routine 1900 begins at operation 1902 where a request is received at the source interface device 1302A to transmit data to a subscriber interface device 1302B-1302D. At operation 1904, subscription information corresponding to the subscriber interface device 1302B-1302D is retrieved. A determination is made at operation 1906 as to whether the subscriber interface device 1302B-1302D may receive the data. This determination includes analyzing the data request in light of the subscription information to ensure that the request is authorized in light of the subscription.

If the subscriber interface device 1302B-1302D is not authorized to receive the requested data, then the subscriber interface device is notified at operation 1908 and the routine ends at operation 1918. However, if the subscriber interface device 1302B-1302D is authorized to receive the requested data, then the requested data is received from a communications network in a first format at operation 1910. At operation 1912, a second format associated with the subscriber interface device 1302B-1302D is identified. The data is translated to the second format at operation 1914 and transmitted to the subscriber interface device 1302B-1302D at operation 1916. The routine ends at operation 1918.

It will be appreciated that exemplary embodiments provide methods, systems, apparatus, and computer-readable medium for interfacing devices with communications networks. Although the exemplary embodiments have been described in language specific to computer structural features, methodological acts and by computer readable media, it is to be understood that the exemplary embodiments defined in the appended claims are not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made without following the example embodiments and applications illustrated and described herein, and without departing from the true spirit and scope of the exemplary embodiments, which are set forth in the following claims.

What is claimed is:

1. A destination interface device for providing communications between a first device and a second device, comprising:
   an input for receiving data in a first format from the first device via a source interface device;
   a processor;
   memory coupled to the processor, the memory comprising instructions that, when executed by the processor, cause the processor to perform operations comprising
      determining that the data cannot be received directly from the first device,
      in response to determining that the data cannot be received directly from the first device, detecting the source interface device configured for transmitting the data to the input,
      determining whether the data can be received from the first device via the source interface device,
      if the data can be received from the first device via the source interface device,
         establishing a peer-to-peer network with the source interface device,
         sending a request for the data from the source interface device,
         receiving the data at the input,
      if the data cannot be received from the first device via the source interface device, then
         detecting a substitute source interface device for receiving the data from the first device, and
         receiving the data from the first device via the substitute source interface device at the input,
      identifying the second device for receiving the data,
      identifying a second format compatible with the second device, and
      translating the data to the second format to create translated data; and
   an output for transmitting the translated data to the second device.

2. The destination interface device of claim 1, wherein the second format is based on a user profile.

3. An interface device for providing communications between a first device and a second device, comprising:
   an input for receiving data in a first format from the first device;
   a processor;
   memory coupled to the processor, the memory comprising instructions that, when executed by the processor, cause the processor to perform operations comprising
      determining whether the data can be received from the first device,
      if the data can be received from the first device, receiving the data at the input,
      if the data cannot be received from the first device, then
         detecting a source interface device configured for transmitting the data to the input,
         sending a request for the data from the source interface device, the request comprising an instruction to transmit the data to the interface device in the first format, and
         receiving the data at the input,
      identifying the second device for receiving the data,
      identifying a second format compatible with the second device, and
      translating the data to the second format; and
   an output for transmitting the translated data to the second device.

4. The interface device of claim 3, wherein the second format is based on a user profile.

5. The interface device of claim 3, wherein detecting a source interface device configured for transmitting the data to the input comprises detecting a signal from the source interface device and establishing a communications link with the source interface device.

6. The interface device of claim 5, wherein establishing the communications link with the source interface device is based on signal characteristics.

7. The interface device of claim 5, wherein establishing the communications link with the source interface device is based on access rights of the interface device.

8. An interface device for providing communications between a first device and a second device, comprising:
- an input for receiving data in a first format from the first device;
- a processor;
- memory coupled to the processor, the memory comprising instructions that, when executed by the processor, cause the processor to perform operations comprising
  - determining whether the data can be received from the first device,
  - if the data can be received from the first device, receiving the data at the input,
  - if the data cannot be received from the first device, then
    - detecting a signal from a source interface device and establishing a communications link with the source interface device based on access rights of the interface device,
    - sending a request for the data from the source interface device, and
    - receiving the data at the input,
  - identifying the second device for receiving the data,
  - identifying a second format compatible with the second device, and
  - translating the data to the second format; and
- an output for transmitting the translated data to the second device.

* * * * *